United States Patent [19]
Tsuchino et al.

[11] Patent Number: 5,493,622
[45] Date of Patent: Feb. 20, 1996

[54] RADIATION IMAGE PROCESSING METHOD WHICH INCREASE AND DECREASES A FREQUENCY REGION OF THE RADIATION IMAGE

[75] Inventors: Hisanori Tsuchino; Masayuki Nakazawa, both of Hino, Japan

[73] Assignee: Konica Corporation, Tokyo, Japan

[21] Appl. No.: 218,972

[22] Filed: Mar. 28, 1994

[30] Foreign Application Priority Data

Apr. 2, 1993 [JP] Japan .................................. 5-076527

[51] Int. Cl.$^6$ ................................................ G06K 9/00
[52] U.S. Cl. ................................................ 382/132
[58] Field of Search ................................. 382/132, 254, 382/256, 258, 259, 257; 364/413.13, 413.17; G06K 9/00

[56] References Cited

U.S. PATENT DOCUMENTS

| | | | |
|---|---|---|---|
| 3,859,527 | 1/1975 | Luckey | 250/34 |
| 5,301,107 | 4/1994 | Shimura | 364/413.13 |
| 5,319,719 | 6/1994 | Nakazawa et al. | 382/6 |
| 5,345,513 | 9/1994 | Takeda et al. | 364/413.13 |
| 5,357,549 | 10/1994 | Maack et al. | 364/413.17 |
| 5,368,033 | 11/1994 | Moshfeghi | 382/6 |
| 5,369,572 | 11/1994 | Haraki et al. | 364/413.13 |

FOREIGN PATENT DOCUMENTS

| | | | |
|---|---|---|---|
| 55-12144 | 1/1980 | Japan | G09K 11/24 |
| 55-163472 | 12/1980 | Japan | G03B 42/02 |
| 60-246188 | 12/1985 | Japan | H04N 1/41 |
| 55189854 | 8/1988 | Japan | G01T 1/29 |
| 3-222577 | 10/1991 | Japan | H04N 7/18 |

*Primary Examiner*—Jose L. Couso
*Attorney, Agent, or Firm*—Frishauf, Holtz, Goodman, Langer & Chick

[57] ABSTRACT

A method of reproducing a radiographic image of a subject includes processing radiographic image signals which indicates a signal level corresponding to an amount of radioactive rays transmitted through each portion of the subject. The method compresses a signal level range of a part of the low frequency region of the radiographic image signals and expands a signal level range of another part of the low frequency region of the radiographic image signals, thereby obtaining image signals that are usable to reproduce the radiographic image.

22 Claims, 18 Drawing Sheets f1(Sus1)

f2(Sus2)

f1+f2

RADIATION IMAGE PROCESSING METHOD WHICH INCREASE AND DECREASES A FREQUENCY REGION OF THE RADIATION IMAGE

BACKGROUND OF THE INVENTION

The present invention relates to a processing method for radiation image signals, and particularly to a technology for obtaining an excellent object image, by which a dynamic range, frequency characteristics, and gradations are appropriately processed in order to improve diagnostic performance.

A radiation image such as an X-ray image is widely used for medical purposes. Conventionally, in order to obtain the X-ray image, a radiograph is widely used in which a fluorescent screen (a fluorescent substance layer) is irradiated with the X-ray passed through an object, a visible light corresponding to a penetrating radiation dose is generated thereby, a film, on which silver salt is used, is irradiated with the visible light, and the film is developed in the same way as an ordinary photograph.

However, recently, a method has been invented by which image information is directly read out from the fluorescent substance layer without using a film on which silver salt is coated.

As an above-mentioned method, the following method is used: a radioactive ray, passed through the object, is absorbed in a stimulable fluorescent substance; after that, the stimulable fluorescent substance is excited by, for example, light or thermal energy; thereby, radiation energy (radiation image information) accumulated in the stimulable fluorescent substance by the adsorption is stimulatingly emitted; and the stimulation emission light is photoelectrically converted and an image signal is obtained.

Specifically, a radiation image conversion method, in which a stimulable fluorescent substance is used, and a visible light or an infrared ray is used as a stimulable excitation light, is disclosed in, for example, U.S. Pat. No. 3,859,527 and Japanese Patent Publication Open to Public Inspection No. 12144/1980. In these disclosures, the following operations are carried out: a stimulable fluorescent panel, in which the stimulable fluorescent substance layer is formed on a support, is used; the stimulable fluorescent substance layer is irradiated with the radioactive rays which have passed through an object; radiation energy corresponding to radioactive ray transmittance of each portion of the object is accumulated to form a latent image; then, the stimulable fluorescent substance layer is scanned by the stimulable excitation light; thereby, the radiation energy, which is accumulated in the fluorescent panel, is radiated and converted into a light signal; and the light signal is photoelectrically converted so that a radiation image signal can be obtained.

As described above, in the system by which the radiation image signal is obtained, and a visible image is obtained according to the image signal, the radiation image signal is processed so that a visible image, which is superior in diagnostic properties, is obtained.

For example, the following processes are carried out: a dynamic range of an original image signal is compressed (refer to Japanese Patent Publication Open to Public Inspection Nos. 189854/1988, 222577/1991); and frequencies are emphasized (refer to Japanese Patent Publication Open to Public Inspection No. 163472/1980).

Dynamic range compression processing is effective for spreading a signal range in which a contrast is acceptable for diagnosis. However, when the compressed region is observed, the contrast of the region is lowered, and the diagnostic properly is lowered. That is, when it is intended to emphasize the contrast in order to improve the diagnostic property for region of interest, dynamic range extension processing muse be carried out instead of compression processing. However, when the extension processing is carried out, the dynamic range is spread, therefore, low density regions become while, the high density region become black. Accordingly, sometimes, information disappears and a range, in which a diagnosis can be carried out, is narrowed. Further, sometimes, the difference between the density of the original image signal and that of the processed image signal becomes large, and accordingly, an accurate reproduction can not be made.

Further, in the image in which a dynamic range of some frequency components of the signals is compressed other (non-compressed) frequency components of the signals, is sometimes seen in a visual sense as if the contrast were lowered. Furthermore, in the image, some regions off which is compressed, the contrast of the other (non-compressed) regions is sometimes seen in a visual sense as if it were lowered, so that the diagnostic property is adversely affected.

SUMMARY OF THE INVENTION

The present invention has been considered in view of conventional problems. One object of the present invention is to provide a radiation image processing method in which: various methods are combined for compression of a dynamic range of an original image; the dynamic range corresponding to that of the original image is maintained so that a visible image, in which there is no information loss, is obtained; the contrast of region of interest can be raised; and a decrease of the visual contrast can be controlled.

In a radiation image processing method in which an original image signal Sorg according to radiation image information which has passed through the object is processed and converted into a processed image signal Sproc, and after that, the processed image signal is reproduced as a visible image, the first radiation image processing method, according to the present invention, is characterized in that: a response of a low spatial frequency range of the original image signal Sorg is de-emphasized so that a portion of a dynamic range of the original image signal Sorg is compression-processed; a response of a low spatial frequency range of the original image signal Sorg is emphasized so that another portion of a dynamic range of the original image signal Sorg is extension-processed, so that the processed image signal Sproc is obtained.

Further, in the above-mentioned method, the following operations may be carried out: unsharp mask signals Sus1 and Sus2 corresponding to each pixel point, are calculated so that they include low spatial frequency components which are the subjects of compression processing and extension processing respectively; a correction junction f1 (Sus1) which decreases in accordance with an increase of Sus1 is see in the signal range in which the compressions-processing is conducted; a correction function f2 (Sus2) which increases in accordance with an increase of Sus2 in the signal range in which extension-processing is conducted; and the processed image signal Sproc is calculated according to the following equation.

$$S_{proc} = S_{org} + f1\,(Sus1) + f2\,(Sus2)$$

In the above case, the correction functions f1 (Sus1) and f2 (Sus2) may be set so that a dynamic range of the processed image signal Sproc is approximately equal to that of the original image signal Sorg. Further, the correction functions f1 (Sus1) and f2 (Sus2) may be set so that the dynamic range of the processed image signal Sproc is narrower than that of the original image signal.

Further, the unsharp mask signals Sus1 and Sus2 may be calculated so that they have the same frequency characteristic or the responsive frequency range of Sus2 is wider than that of Sus1, and Sus2 includes higher frequency components than Sus1.

Furthermore, in the radiation image processing method in which the original image signal Sorg according to radiation image information which has passed through the object, is processed and converted into the processed image signal Sproc, and after than, the processed image signal is reproduced as a visible image, the second radiation image processing method, according to the present invention, is characterized in that: the response of the low spatial frequency range of the original image signal Sorg is de-emphasized so than the dynamic range of the original image signal Sorg is compression-processed; the response of the high spatial frequency range of the original image signal Sorg is emphasized so that the high spatial frequency range of the original image signal Sorg is emphasis-processed; and then the processed image signal Sproc is obtained.

in the above-mentioned method, the following operation may be carried out: the spatial frequency characteristic of the processed image signal Sproc is de-emphasized in a low spatial frequency side in which the frequency is lower than a predetermined spatial frequency h1, and is emphasized in a high spatial frequency side in which the frequency is higher than h1, with respect to the spatial frequency characteristic of the original image signal Sorg.

Further, h1 may be set corresponding to a radiographing region so that h1 is shifted to the low spatial frequency side in the case where there exist many low frequency components in the image signal, or so that h1 is shifted to the high spatial frequency side in the case where there exist many high frequency components in the image signal.

Further, the above-mentioned h1 may be set within the range of 0.01 lp/mm $\leq$ h1 $\leq$ 0.5 lp/mm.

Further, the following operations may be conducted for each pixel of the original image signal Sorg: the unsharp mask signal Sus1 is calculated so that the response at the predetermined spatial frequency h1 is smaller than 0.2 times of the response of the original image signal Sorg; the unsharp mask signal Sus2 is calculated so that the response at h1 is larger than 0.8 times of the response of the original image signal Sorg; and then the following operation is carried out with respect to the original image signal Sorg in order to obtain the processed image signal Sproc.

$$S_{proc} = S_{org} + f1\,(Sus1) + f2\,(Sorg - Sus2)$$

Where, f1 (Sus1) is a monotonously decreasing function which decreases when Sus1 is increased, and f2 (Sorg−Sus2) is a monotonously increasing function which increases when (Sorg−Sus2) is increased.

Further, the spatial frequency emphasis may be conducted on only the compression-processed region in the image, or on only the non-compression-processed region in the image.

In the radiation image processing method in which the original image signal Sorg according to radiation image information which has passed through the object, is processed and converted into the processed image signal Sproc, and after that, the processed image signal is reproduced as a visible image, the third radiation image processing method, according to the present invention, is characterized in that: the dynamic range compression processing, by which the response of the low spatial frequency range of the original image signal Sorg is de-emphasized, is conducted in order to obtain the first processed image signal Sproc1; next, the dynamic range extension processing, by which the response of an entire spatial frequency range of the first processed image signal Sproc1 is emphasized corresponding to the dynamic range of the first processed image signal Sproc1, is conducted; and after that, the extension-processed image signal is gradation-processed in order to obtain the second processed image signal Sproc2.

In the radiation image processing method in which the original image signal Sorg according to radiation image information which has passed through the object, is processed and converted into the processed image signal Sproc, and after that, the processed image signal is reproduced as a visible image, the fourth radiation image processing method, according to the present invention, is characterized in that: the dynamic range extension processing, by which the response of the entire spatial frequency range of the original image signal Sorg is emphasized, is conducted in order to obtain the first processed image signal Sproc1'; next, the dynamic range compression-processing, by which the response of the low spatial frequency range of the first processed image signal Sproc1' is de-emphasized corresponding to the dynamic range of the first processed image signal Sproc1', is conducted; and after that, the compression-processed image signal is gradation-processed in order to obtain the second processed image signal Sproc2'.

In these third and fourth radiation image processing methods, the dynamic range extension processing may extend the entire dynamic range area of the first processed image signal Sproc1 or the original image signal Sorg; or may extend only the dynamic-range-compressed area of the first processed image signal Sproc1; or may extend only the area other than the dynamic-range-compressed area of the first processed image signal Sproc1.

Further, the extension processing may be conducted so than the dynamic range of the second processed image signal Sproc2 or Sproc2' is approximately equal between different objects.

Further, the gradation-processing may be conducted so that the dynamic range of the second processed image signal Sproc2 or Sproc2' is almost the same as the dynamic range at the time when the original image signal. Sorg is gradation-processed.

In the compression of the dynamic range, the unsharp mask signal Sus corresponding to the low spatial frequency at each pixel point of the original image signal Sorg may be calculated, and then the following operation may be conducted with respect to the original image signal Sorg in order to obtain the processed image signal Sproc.

$$S_{proc} = S_{org} + f\,(Sus)$$

Where, f (Sus) is a function which monotoneously decreases as Sus is increased.

Further, a compression ratio in the dynamic range compression processing may be increased corresponding to the increase of the dynamic range of the original image signal Sorg.

Further, the compression ratio may be changed so that the dynamic range of the first processed image signal Sproc1 or Sproc1' are almost equal between different objects.

The compression ratio of the dynamic range may be changed so that the dynamic range of the first processed image signal Sproc1 or Sproc1' becomes a predetermined dynamic range.

According to the first radiation image processing method, the response of the low frequency range of the original image signal Sorg is de-emphasized so that a portion of the dynamic range of the original image signal Sorg is compression-processed; the response of the low frequency region of the original image signal Sorg is emphasized so that another portion of the dynamic range is extension-processed; therefore, in a region, in which high diagnostic properties are specifically required, the extension processing is conducted so that a contrast is enhanced; and on the other hand, compression-processing is conducted in other regions, so that a visible image, in which loss of information is prevented, can be obtained.

Further, when compression processing is conducted using the correction function f(Sus1) which is set as a monotoneously decreasing function corresponding to the increase on an unsharp mask signal Sus1, and when extension processing is conducted using the correction function f(Sus2) which is set as a monotoneously increasing function corresponding to the increase of an unsharp mask signal Sus2, a contrast of the high frequency component is fully secured and high diagnostic properties can be obtained.

Further, when the above-mentioned correction function f(Sus) is set so as to have characteristics in which the dynamic range of the processed image signal Sproc approximately coincides with that of the original image signal Sorg, a visible image, which has the same density range as that of the original image and has no information loss, can be obtained.

For example, when the dynamic range of region of interest is much smaller than the dynamic range of the entire original image signal Sorg, the contrast of the region of interest can be more enhanced so that diagnostic properties can be improved, by following operations: the dynamic range of the processed image signal Sproc is made to be smaller than that of the original image signal Sorg; after that, the dynamic range of region of interest is extended.

Further, in contrast to the case where the frequency range, in which the contrast can be enhanced, can be relatively large when the unsharp mask signals Sus1 and Sus2 are have the same frequency characteristic, the frequency range, in which the contrast is relatively enhanced by the increase of the compressed frequency region, is limited to the high frequency side when the frequency characteristic of Sus1 has narrower frequency range and lower frequency components than that of Sus2. Accordingly, an appropriate case can be selected from the above-mentioned two cases corresponding to a radiographing region.

Next, according to the second radiation image processing method, when the frequency characteristic is de-emphasized in a low spatial frequency side through the entire signal range of the original image signal Sorg, the entire dynamic range is greatly compressed, and further the frequency characteristic is emphasized in the high spatial frequency side through the entire signal range of the original image signal Sorg. Accordingly, the contrast of the high frequency component can be high through the entire range of the image signal, and specifically, the diagnostic property can be enhanced in the case where the dynamic range (density range) of region of interest is broad.

Further, when a boundary frequency h1 between the de-emphasized frequency and emphasisized frequency in the frequency characteristic is shifted to the side in which many desired frequency components are included, the contrast on this frequency side, including many desired frequency components, is more emphasized, so that the appropriate diagnostic property corresponding to the radiographic region can be obtained.

For example, when the above-mentioned h1 is set as follows, $0.01$ lp/mm $\leq$ h1 $\leq 0.5$ lp/mm, good results can be obtained.

The unsharp mask signal Sus1, in which the response at the predetermined spatial frequency h1 is smaller than 0.2 times of the response of the original image signal Sorg, and the unsharp mask signal Sus2, in which the response at the above-mentioned h1 is larger than 0.8 times of the response of the original image signal Sorg, are calculated. Then, when the processed image signal is obtained from the above-mentioned equation, that is, Sproc=Sorg+f1 (Sus1)+f2 (Sorg−Sus2), using the correction function f (Sus1), which is see as a monotonously increasing function corresponding to the increase of the unsharp mask signal Sus1, and the correction function f (Sus2) which is set as a monotoneously increasing function corresponding to the increase of the unsharp mask signal Sus2, the low frequency component is de-emphasized when the original image signal Sorg is added by f1 (Sus1), and the high frequency component is emphasized when the result of the above-mentioned addition is further added by f2 (Sorg−Sus2). Accordingly, the contrast in the high frequency component, which is important in diagnostic properties, can be obtained while the dynamic range of the entire image is being compressed.

Further, when the spatial frequency emphasis operation is conducted on only the compression-processed region in the image, the de-emphasis operation of the low frequency component and the emphasis operation of the high frequency component are conducted on the same region in the image. On the other hand, when the spatial frequency emphasis operation is conducted on only the non-compression-processed region in the image, only the de-emphasis operation of the low frequency component is conducted on a region, and only the emphasis operation of the high frequency component is conducted on another region. These operations may be selected depending on whether the frequency component, in which the contrast is desired to be enhanced corresponding to the radiographing region, is deviated or dispersed.

According to the third radiation image processing method, when the dynamic range of the low spatial frequency range is compression-processed, the dynamic range of the entire spatial frequency range is extension-processed and gradation-processed, the desired dynamic range can be secured, and the dynamic range of the high frequency range can be extended so that the contrast is enhanced. Extension processing may be selected corresponding to the characteristics of the radiographing region depending on the following cases: the case where the extension processing is conducted in the entire dynamic range region; the case where the extension processing is conducted in the region in which compression processing has been conducted; or the case where the extension processing is conducted in the region in which compression processing has not been conducted.

In the fourth radiation image processing method, the processed image signal Sproc, which is nearly the same as that in the third radiation image processing method, is obtained although the sequence of operations is a reverse of the third radiation image processing method.

In these third and fourth radiation image processing methods, dynamic range extension processing may be conducted depending on the following dynamic ranges of region of interest: the entire dynamic range of the first processed image signal Sproc1 or Sproc 1'; the dynamic range, which has been compression-processed, of the first processed image Sproc1; or the dynamic range, which has not been compression-processed, of the first processed image signal Sproc1.

Further when the above-mentioned extension-processing is conducted se that the dynamic range of the processed image signal Sproc2 after gradation processing is nearly equal between different objects, the dynamic range of the visible image becomes constant without depending on the object, so that stable diagnostic properties can be secured.

Further, when gradation processing is conducted so that the dynamic range of the image, in which the original image signal Sorg has seen gradation-processed, is nearly equal to the dynamic range on the image in which the second processed image signal Sproc2 is gradation-processed, the contrast is appropriately enhanced, and the fidelity of the original image compared to the reproduced image can be improved.

Concerning the compression of the dynamic range, when the correction function f1 (Sus1), which is increased accompanied with an increase of the unsharp mask signal Sus1, is set, and the calculation is conducted using the equation Sproc=Sorg+ f1 (Sus1), then, only the low spatial frequency region can be compressed as described above.

Further, when the compression ratio in the compression processing of the above-mentioned dynamic range is increased corresponding to the increase of the dynamic range of the original image signal Sorg, the dynamic range of the visible image can be made to be constant without depending on the dynamic range of the original image signal Sorg.

Alternatively, when the compression ratio of the dynamic range is changed so that the dynamic range of the processed image becomes constant between different objects, the dynamic range of the visible image becomes constant without depending on the object, reliable diagnostic properties can be secured. Further, the compression ratio can also be changed so that a predetermined dynamic range is obtained.

DETAILED DESCRIPTION OF THE PREFERRED EMBODIMENT

Embodiments of the present invention will be described below.

Figure 1:
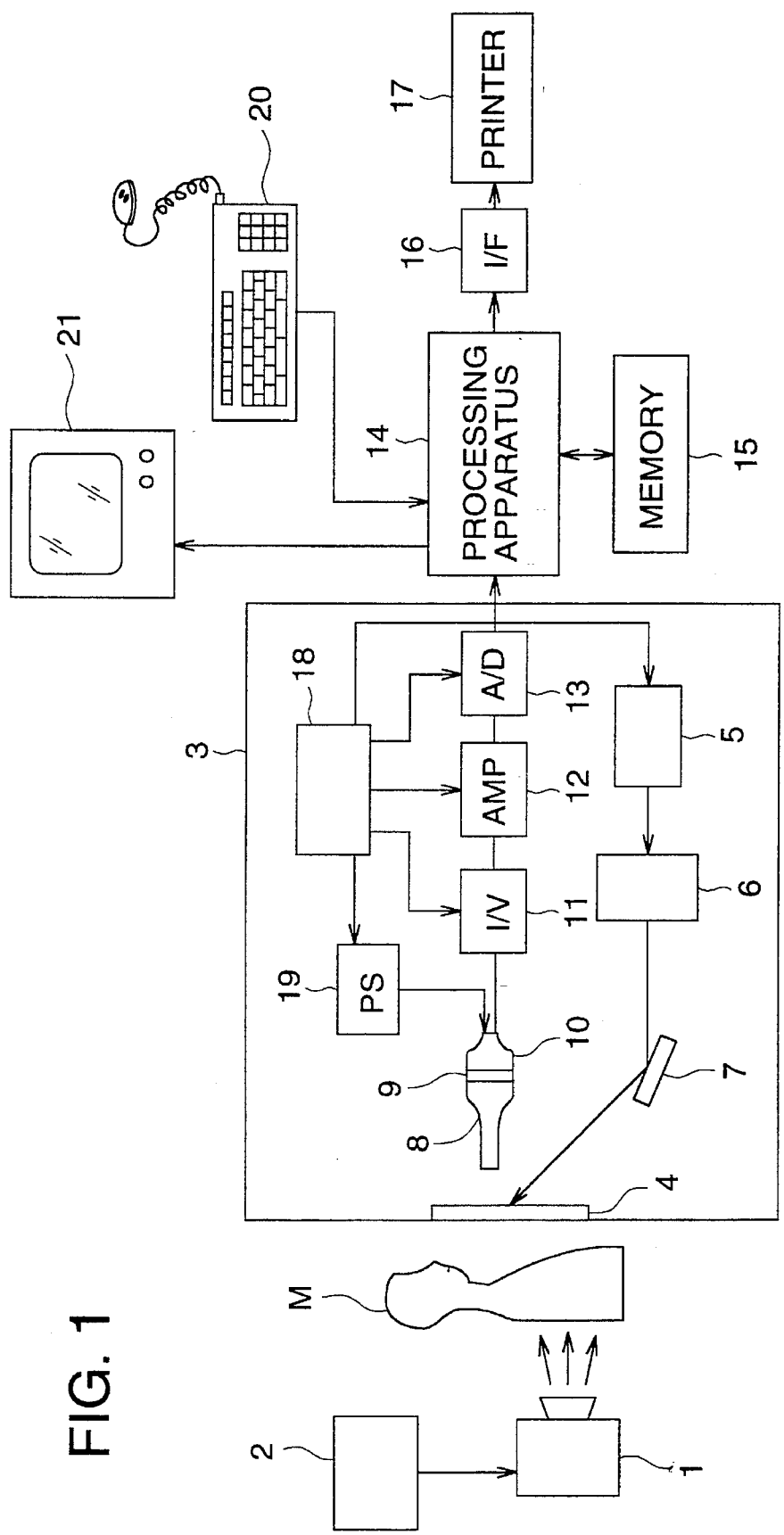
FIG. 1 is a block diagram showing a radiation image read-out processing apparatus to which the present invention is applied.

FIG. 1 is a view showing a radiation image information reading apparatus including an image processing apparatus, to which a radiation image processing method according to the present invention is applied, and also showing an example in which radiographing of a human chest portion is conducted for medical purposes.

In FIG. 1, a radiation generating source 1 is controlled by a radiation control apparatus 2, and generates a radiation (generally X-rays) an object M (such as a human chest portion or the like). Object M is disposed between the radiation generating source i and a conversion panel 4 which is provided in a recording reading apparatus 3. The conversion panel 4 stores energy according to distribution of a radiation transmission ratio of object M to a quantity of radiation irradiated from the radiation generating source 1 on a stimulable layer, and a latent image of object M is formed on the layer.

In the above-mentioned conversion panel 4, a stimulable fluorescent layer is provided on a support by vapor phase accumulation of a stimulative fluorescent substance, or coating of a stimulative fluorescent substance. The stimulable layer is shielded or covered by a protective member in order to protect the layer from unfavorable effects due to environment and damage. As stimulable fluorescent materials, there are used materials which are disclosed in Japanese Patent Publication Open to Public Inspection No. 72091/1986, or No. 75200/1984.

A light beam generation section (gas laser, solid state laser, semiconductor laser) 5 generates a light beam in which outgoing beam strength is controlled, and the light beam arrives am a scanner 6 through various optical systems. The light beam is deflected by the scanner, further, an optical path of the light beam is deflected by a reflection mirror 7, and the light beam is guided to the conversion panel 4 as a scanned stimulating light.

A light collection member 8 which consists of optical fibers is provided so that the light collection end is located near the conversion panel 4 on which the stimulating light is scanned. When scanned with the above-mentioned light beam, the conversion panel 4 emits a photostimulated luminescence of an intensity proportional to the latent image, and the emission is received by light collection end and guided to a filter 9 through the light collection member 8. Only a light in a stimulated laminescence wavelength region can be passed the filter 9. The emission which has passed the filter 9 is allowed to enter a photomultiplier tube 10, and photoelectrically converted into a current signal corresponding to an incident light.

An output current from the photomultiplier tube 10 is converted into a voltage signal by a current/voltage converter 11, and is amplified by an amplifier 12; and after that, it is converted into a radiation image signal, composed of digital data of each pixel, by an A/D converter 13. Then, this digital radiation image signal (original image signal Sorg) is successively outputted to an image processing apparatus 14 in which a microcomputer is housed.

Numeral 15 is an image memory (magnetic disk apparatus) in which an image signal is stored. Numeral 16 is an interface by which a radiation image signal read out directly from the image processing apparatus, or from the image memory 15, is transmitted to a printer 17. Numeral 18 is a read-out gain adjusting circuit, by which light beam strength adjustment, gain adjustment of the photomultiplier 10 by power supply voltage adjustment of the high voltage power supply 19 for the photomultiplier, gain adjustment of the current/voltage converter 11 and amplifier 12, and input dynamic range adjustment of the A/D converter 13 are carried out, and a read-out gain of the radiation image signal is comprehensively adjusted.

Numeral 20 is a key board by which necessary information such as a radiographing region and the like, is inputted into the image processing apparatus 14. Numeral 21 is a monitor into which the processed image signal Sproc is inputted, and by which the image signal is reproduced and displayed as a visible image, wherein, in the image processing apparatus 14, various processing according to the present invention, which will be described later, has been conducted on the processed image signal Sproc.

The radiographing image processing according to the present invention is carried out in the image processing apparatus 14 as described above.

Initially, as a radiation image processing method according to the first invention, an example of a method, by which a dynamic range of the original image signal Sorg to be inputted is compression/extension processed at each region, and the processed image signal Sproc is obtained, will be explained below.

Figure 2:
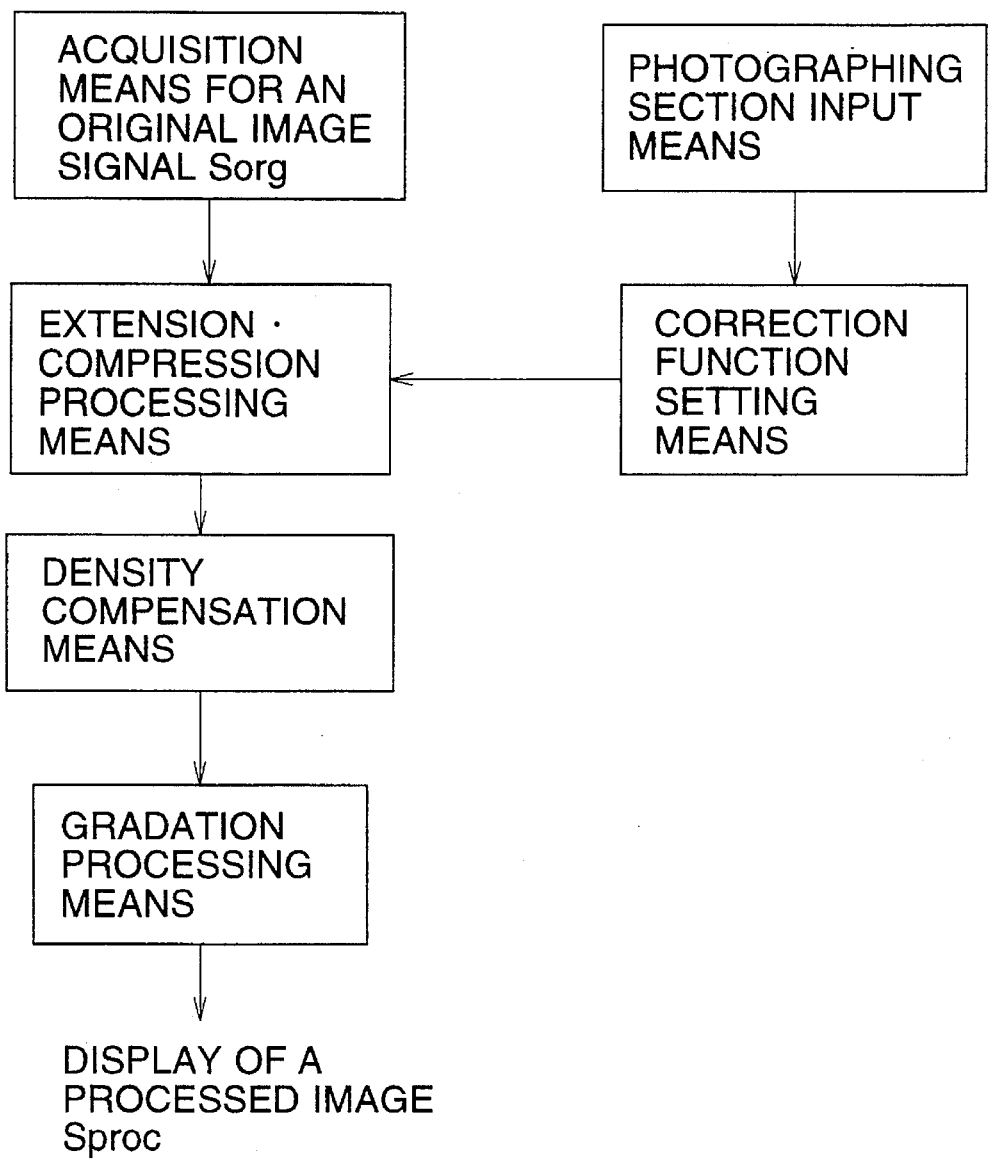
FIG. 2 is a block diagram for control of the first embodiment according to the first invention.

FIG. 2 shows a block diagram for control of this embodiment.

The original image signal Sorg is obtained by the following methods in the acquisition means of the original image Sorg: a method in which the stimulative fluorescent substance is scanned by an excitation light, and emitted stimulation emission of light is photoelectrically converted so that the original image Sorg is obtained; a method in which, for example, an image on the radiographic film is read out by photoelectric conversion; a method in which a fluorescent substance is irradiated by radiation passed through the object so that the radiation is converted into fluorescent light, and then the fluorescent light is photoelectrically converted and read out.

A radiographing range input means inputs the radiographing range into an image processing apparatus 14 by a key board 20, or by a menu screen (touch panel screen) displayed on the monitor 21.

A correction function setting means sets a correction function so that the dynamic range of the original image signal Sorg is extended/compressed corresponding to the inputted radiographing range. When a radiation image of a side view of a chest portion is taken as an example, since the thickness of the object is specifically high, there are many scattered beams of light, and the contrast is significantly lowered due to the scattered beam of light specifically in a low density portion. Since the frequency component of the scattered beam of light is very low, when the dynamic range in the low density region is extended by the correction function of the unsharp mask signal from which a very low frequency component is extracted, the contrast of the chest portion, which is a concerned region, is recovered, and the dynamic range of a high density region is compressed so that the loss of information of the original image signal Sorg is prevented, thereby the displayed density range can be secured. Image processing such as the dynamic range compression/extension is carried out according to the following equation.

$$S_{proc} = S_{org} + f(S_{us})$$

Figure 3:
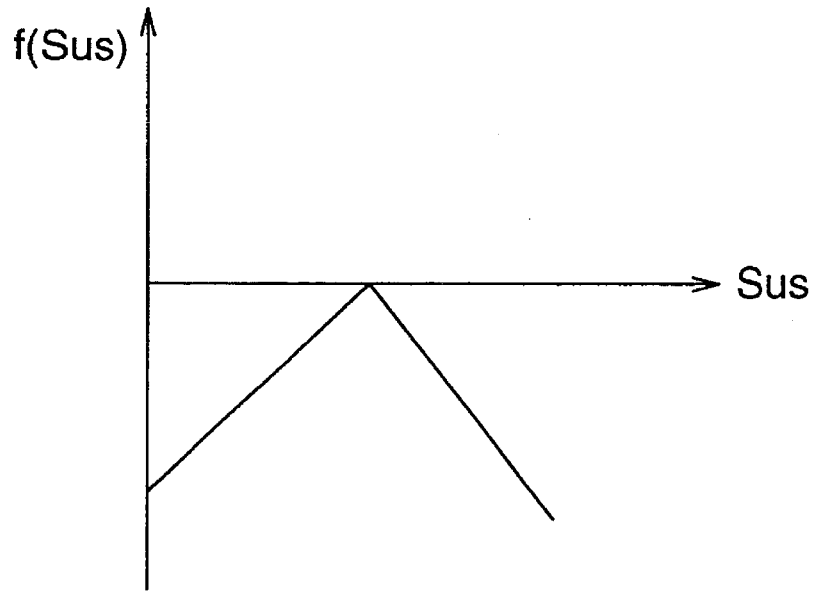
FIG. 3 is a diagram snowing an example of the characteristic of a correction function which is used in the first embodiment.
Figure 4:
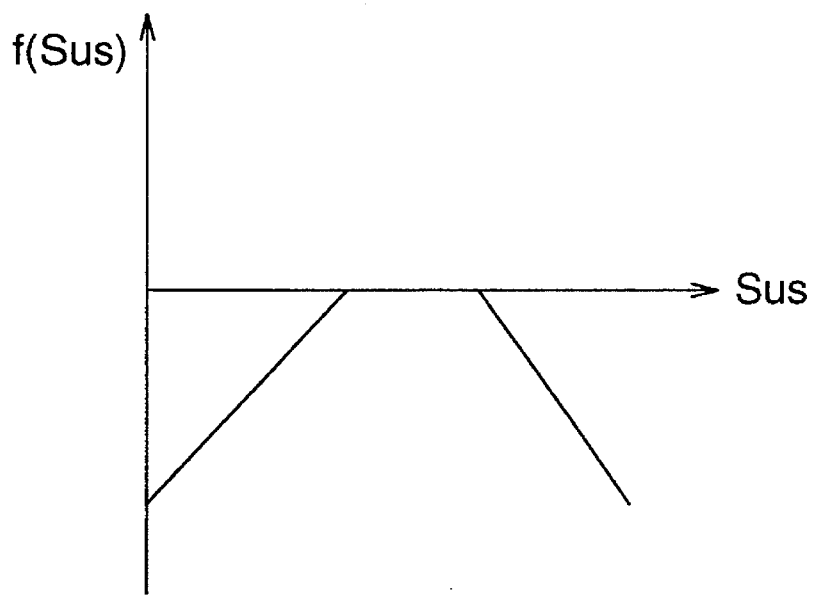
FIG. 4 is a diagram showing the second example of the characteristic of the correction function which is used in the first embodiment.

In the equation, Sus is an unsharp mask signal which can be obtained by averaging the original image signal Sorg in a predetermined mask region including each pixel point, corresponding to each pixel point. Further, f (Sus), which is added to the original image signal Sorg, is a correction function which is obtained as a function of the unsharp mask signal Sus, and the correction function f (Sus) is set corresponding to the radiographing region. In the case of a side view image of a chest portion, the correction function f (Sus) is set as follows: it is increased from a negative value to zero when Sus is increased, and then, it is decreased in the negative direction, as shown in FIG. 3; or after the correction function is increased from a negative value to zero when Sus is increased, zero is kept in some range, and then, it is decreased in the negative direction, as shown in FIG. 4. When the above-mentioned two correction functions are compared to each other, generally, the correction function shown in FIG. 4, including no inclined region in which the contrast of the original image signal Sorg is maintained, is preferable.

An extension/compression processing means carries out processing by the above-mentioned equation using the correction function f (Sus) having the above-mentioned characteristic. After the processing operation has been carried out, the correction is carried out in the low density region by the correction function f (Sus) so that the difference between densities is increased, and the dynamic range is extended. In the high density region, the correction is carried out by the correction function f (Sus) so that the difference between densities is decreased, and the dynamic range is compressed.

The contrast in the low density region is increased due to this extension processing, and the loss of information of the original image signal Sorg can be prevented and the density range for display can be secured due to this compression processing.

Figure 7:
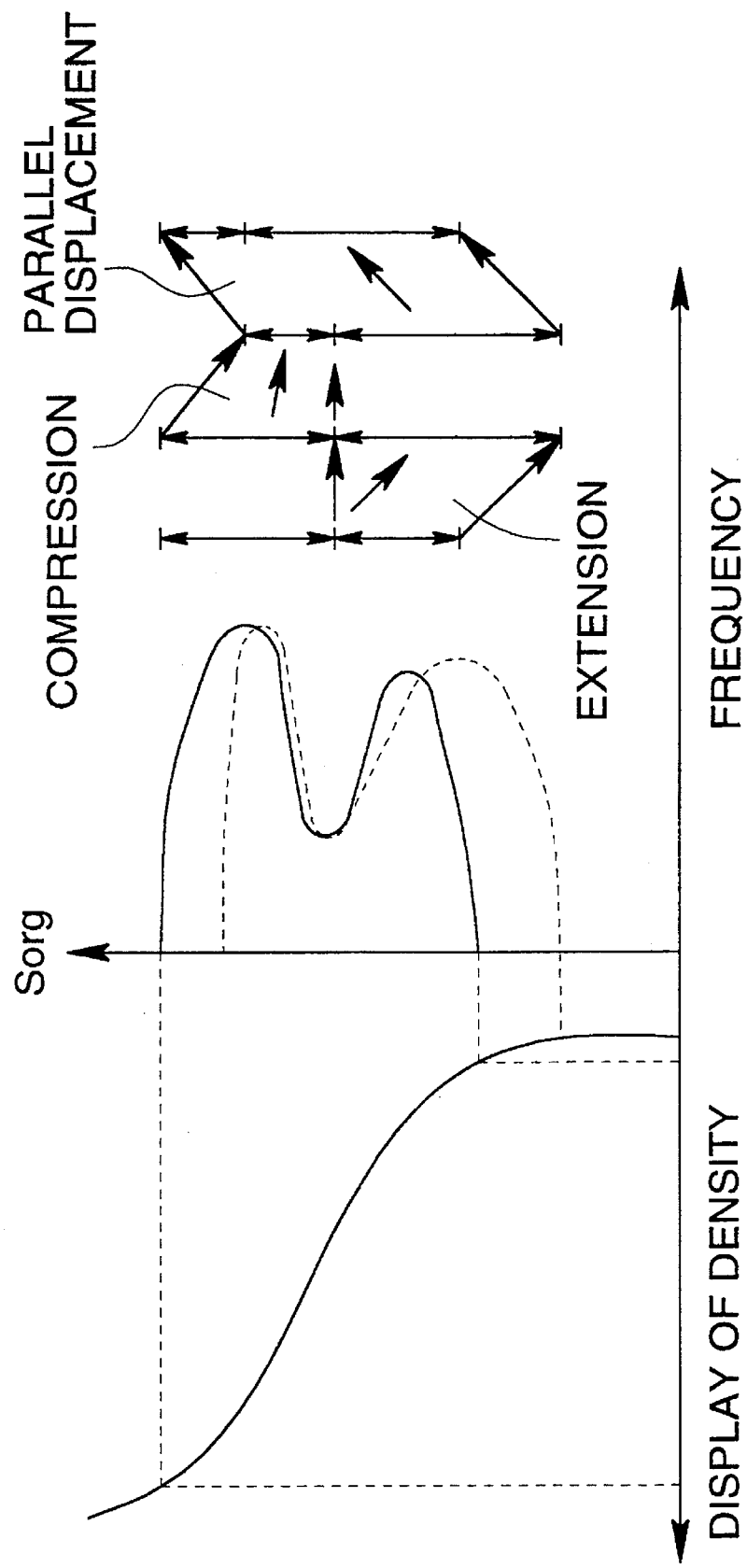
FIG. 7 is a diagram showing conditions before and after extension/compression processing in the first embodiment of the first invention.

However, when the image signal, in which extension/compression processing has been carried out, is outputted without no correction, normally gradation processed and displayed, the low density region is distributed in a range in which inclination of the signal-display density characteristic curve is very small as shown in FIG. 7; the effect due to the increase of the contrast caused by the extension of the dynamic range becomes very small; since the density is decreased lower than the density of the original image signal Sorg even in the high density region, the effect due to the decrease of the contrast is very pronounced, so that the diagnostic property is lowered.

Due to the foregoing, a density correction means carries out the processing operation in order to increase and to correct the density which has been lowered as a whole by the extension/compression processing. In this case, when the processing operation is carried out so that an amount of the decrease of the density at the minimum density level due to the extension processing coincides with an amount of the decrease of the density at the maximum density level due to the compression processing, that is, so that the dynamic range is hoe changed, the minimum density for display can be perfectly equal to the maximum density for display, before and after this correction processing, when only the amount of the decrease of the density is corrected in order to increase the density; this operation is preferable. When the amount of the decrease of the density at the minimum density level is different from that at the maximum density level, the density is corrected in order to increase the density by an averaged amount of the above-mentioned two values, or the density in the concerned range side (generally, in the extension side) is corrected so that it is close to the density at the level before the processing operation. In FIG. 7, the characteristic curve of the processed image signal Sproc shown by a dotted line before the density correction, is parallel-displaced to the curve shown by a solid line in the upper direction in the drawing.

When the above-mentioned density correcting operation is carried out, the range of the density for a display of the entire image can be approximately equal to that of the original image signal Sorg. Accordingly, the effect due to the extension operation is fully displayed and the contrast in the low density region is increased; the diagnostic property in the lung portion, which is a concerned range, is improved; and although the contrast in the high density region is more or less decreased by the compression operation, the density for the display can be approximately equal to that of the original image signal Sorg, and therefore, the lowering of the diagnostic property can be prevented.

A gradation processing means outputs the processed image signal Sproc in which the image signal, which has been extension/compression-processed and the density of which has been corrected, is gradation conversion-processed. The outputted image signal is displayed in a monitor 20.

In the above-mentioned method, the density increase correcting operation is conducted after the extension/compression operation. However, when the gradation characteristic is changed, or the characteristic of the correction function f (Sus) is set to the characteristic which is moved in the direction off increase in the entire region, it is not necessary that the density increase correction is specifically carried out.

Figure 5:
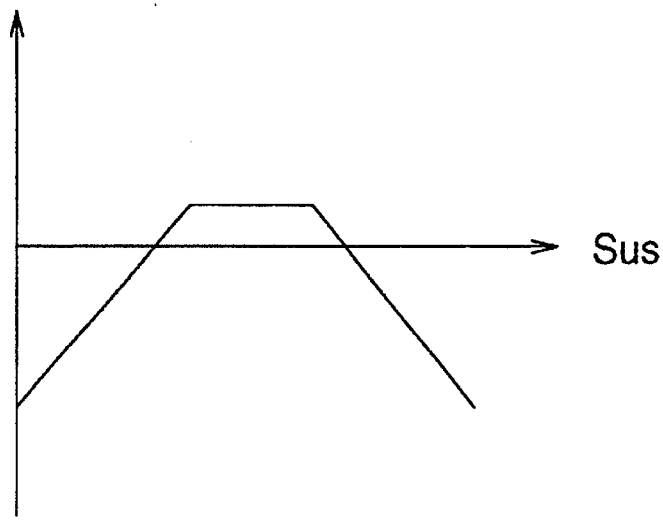
FIG. 5 is a diagram showing the third example of the characteristic of the correction function which is used in the first embodiment.
Figure 6:
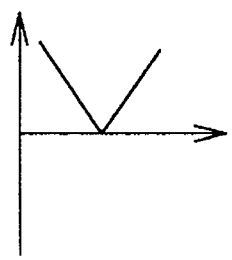
FIGS. 6(a), 6(b), 6(c) and 6(d) are diagrams showing the fourth to seventh examples of the characteristic of the correction function which is used in the first embodiment.
Figure 6:
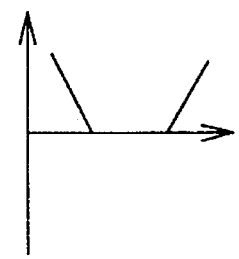
Figure 6:
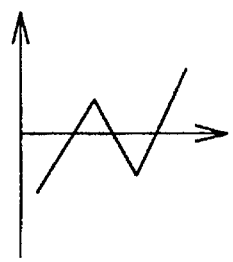
Figure 6:
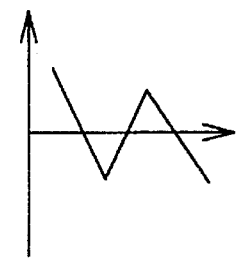

Further, the diagnostic portion, which is a radiographing object, is not limited to a side view of the lung portion, and accordingly, the correction function for extension/compression is not limited to the function shown in FIGS. 3, 4 and 5. For example, when the concerned region is located in the high density side, the correction function may be set to the function in which the compression processing operation is conducted in the low density region, and the extension processing operation is conducted in the high density region as shown in FIGS. 6(a), and 6(b), which are reverse to this embodiment. When the concerned region is located in both the low density region and the high density range, the correction function may be set to the function in which extension→ compression→extension processing operations are conducted accompanied with an increase of the density as shown in FIG. 6(c). When the concerned region is located in a middle density region, the correction function may be set to the function in which compression→extension→ compression processing operations are conducted accompanied with an increase of the density as shown in FIG. 6(d). As described above, in the concerned region in which, generally, a high diagnostic property is required, the extension processing operation may be conducted so that the contrast is enhanced, and the compression processing operation may be conducted so that the range of the desired density for display is secured.

In this embodiment, the size of the unsharp mask and the frequency characteristic are very important parameters in the diagnostic property.

In the dynamic range compression processing, only the very low frequency component corresponding to the rough change of the structure of the object (smooth signal difference between portions such as a lung field portion, and a mediastinum portion) is extracted as the unsharp mask signal Sus. When the correction value f1 (Sus) is set according to Sus, the entire density range can be compressed, maintaining the information corresponding to the changes of minute structures (bone, blood vessel, and the like) as it is.

When the size of the mask is small, the unsharp mask signal Sus includes not only the very low frequency component corresponding to the rough change of the object, but also the frequency component corresponding to a minute change of a structure, and the change of the minute structure is negated by adding the correction value corresponding to the unsharp mask signal Sus, so that the contrast of bone and blood vessel is lowered.

When the size of thee mask is large, the sharpness of the edge of the unsharpness image is deteriorated in a portion in which the signal value is abruptly changed, and undesired compression processing is carried out near the boundary between a range in which compression processing is desired, and a range in which compression processing is not desired. Further, when the mask size is too large, the frequency component corresponding to the rough change of the object is lost (in extreme cases, the image is entirely flat). Accordingly, even when the correction value corresponding to the unsharp mask signal Sus is added, the effect of the compression of the dynamic range is lost.

Figure 15:
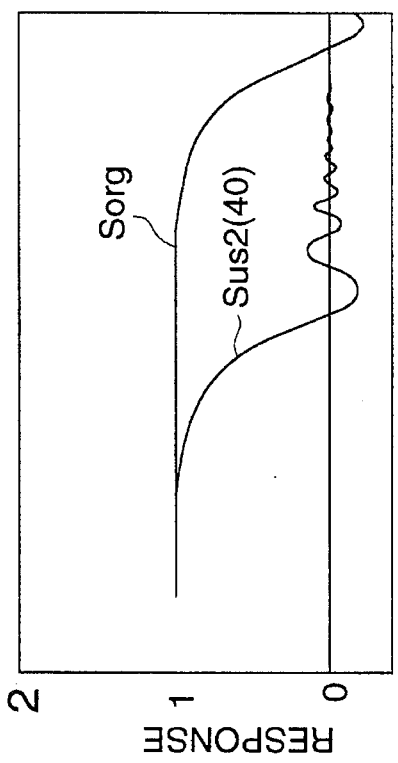
FIGS. 15(a), 15(b), 15(c) and 15(d) are diagrams showing characteristics of signals in the embodiments of the first invention.
Figure 15:
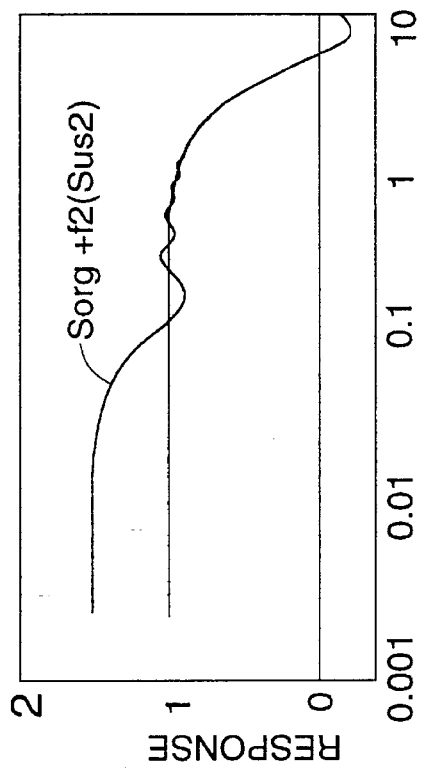
Figure 15:
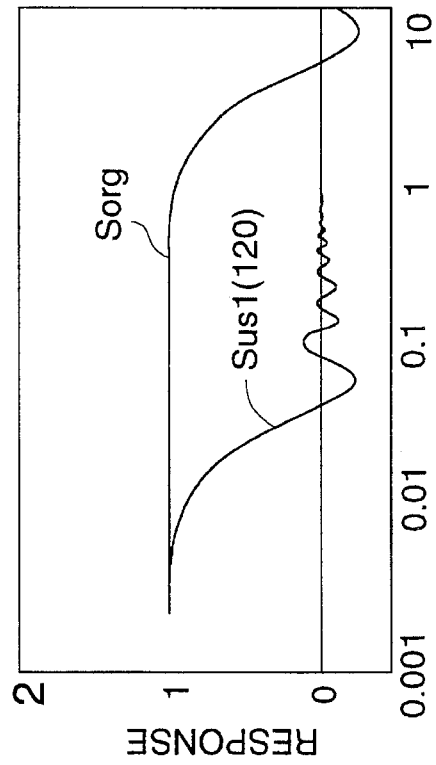
Figure 15:
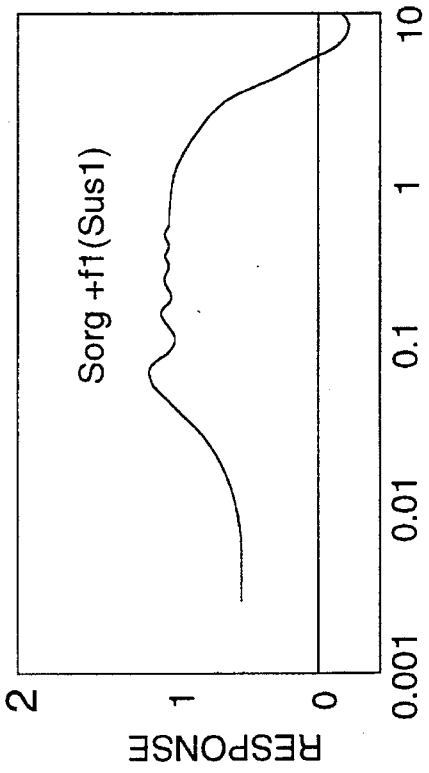

As a result of consideration by the inventor, it has been found that the size of the mask is preferably 10 mm to 60 mm in the length on the life-size image, more preferably, 15 mm to 30 mm, and most preferably, 20 mm to 30 mm. FIGS. 15(a) and 15(c) show characteristics of the unsharp mask signal Sus1 and the original image signal Sorg when the sizes of the masks are 120 mm and 40 mm respectively. FIGS. 15(b) and 15(d) show characteristics of the processed image signal Sproc=Sorg+f1 (Sus1) when the sizes of masks are respectively 120 mm and 40 mm.

When the size of the mask is smaller than 10 mm, the frequency component corresponding to changes of the minute structure suddenly increases. Accordingly, when the correction value is set according to the unsharp mask signal S which has been obtained in the above-mentioned mask size, the diagnostic property is drastically lowered. Specifically, in images of the chest region or images of the abdominal region, the following has been found: when the size of the mask is larger than 15 mm, Sus does not have the frequency component corresponding to large blood vessels such as the main artery; and when the size of the mask is larger than 20 mm, Sus does not include the frequency component, which is a relatively low frequency corresponding to ribs or the like, and the contrast of which is not desired to be lowered, and therefore, images with high diagnostic property can be obtained.

Here, the mask size indicates an average value of a short dimension and a long dimension in the case where the shape of the mask is rectangular, a length of a side in the case where the shape of the mask is square, a diameter in the case where the shape of the mask is circular, or an average value of a major axis and a minor axis in the case where the shape of the mask is oval.

Further, when the above description is expressed with the frequency characteristic of the unsharp mask in place of the above-mentioned mask size, the following is preferable. The modulation transfer function of the unsharp mask is preferably more khan 0.5 when the spatial frequency is 0.01 pl/mm, and less than 0.5 when the spatial frequency is 0.06 pl/mm. The modulation transfer function is more preferably more than 0.5 when the spatial frequency is 0.021 lp/mm, and less than 0.5 when the spatial frequency is 0.041 lp/mm. The modulation transfer function is further preferably more than 0.5 when the spatial frequency is 0.021 lp/mm, and less than 0.5 when the spatial frequency is 0.031 lp/mm.

In average processing in order to obtain the unsharp mask signal Sus, as shown in the present invention, when weighting processing is conducted corresponding to the absolute value of the difference between signals of the center pixel and the peripheral pixel in the mask region, and/or when weighting processing is conducted corresponding to a positional relationship of the center pixel and the peripheral pixel in the mask region, deterioration of sharpness of the edge of the unsharpness image in the range, in which the signal value is suddenly changed, can be prevented. Further, the preferable range of the mask size can be spread from '10 mm to 60 mm' to '10 mm to 80 mm'.

Further, in the present invention, in order to obtain the maximum value of the absolute value of the correction function f1 (Sus) which is a function of the unsharp mask signal Sus1, the dynamic range of the concerned region of the object is preferably ⅛ to ½. For example, when the dynamic range of the concerned range of the object is expressed by two digits, the maximum value of the absolute value of the compression correction amount is preferably expressed by ¼ digits to 1 digit.

Further, when f1 (Sus1) is expressed by a linear function of the unsharp mask signal Sus1, such as $f1\ (Sus1)=\alpha\ (A-Sus)$, (where A and $\alpha$ are constant), a preferable range of compression, by which a degree of the compression is decided, is $0.2 \leq \alpha \leq 1.0$, and more preferably is $0.4 \leq \alpha \leq 0.8$.

When the amount of correction is too small, the effect of compression of the dynamic range can not be obtained. On the other hand, when the amount of correction is too large, a relationship of magnitude of the density in each region in the original image is reversed, (for example, the average density of a mediastinum region is larger than that of a lung region), and therefore, the image becomes unsuitable for diagnostic purposes. For example, when an inclination $\alpha$ of the linear function is larger than 1, the above-mentioned problem occurs.

Figure 16:
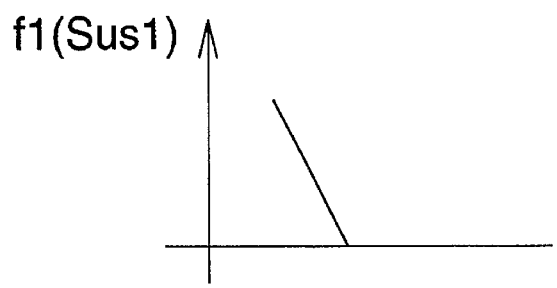
FIGS. 16(a) and 16(b) are diagrams showing examples of characteristics of the correction function in the embodiments of the first invention.
Figure 16:
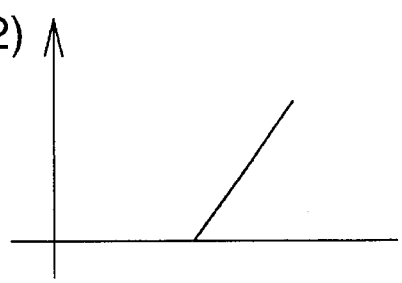
Figure 16:
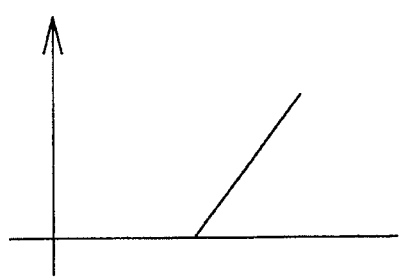
Figure 16:
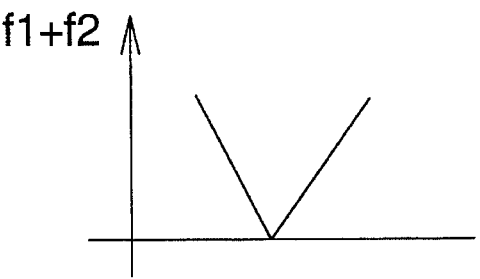
Figure 16:
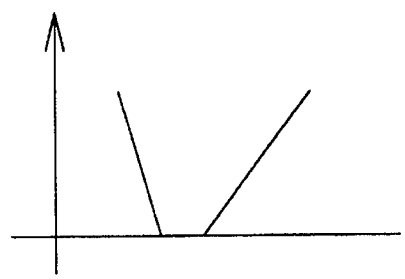

When a function of the unsharp mask signal is used for compression processing of the dynamic range, and another function of the unsharp mask signal is used for extension processing of the dynamic range, the range of the unsharp mask signal Sus2 used for extension processing may be broader than that of the above-mentioned Sus1. Correction functions f1 (Sus1), and f2 (Sus2) of the unsharp mask signals Sus1 and Sus2, and a correction function f (Sus)= f1 (Sus1)+f2 (Sus2), in which the above-mentioned two correction functions are added to each other, are shown in FIG. 16. In FIG. 16(b), a degree of compression of the dynamic range in the low density region is large and the contrast is lowered. However, in the middle density range formed between the low density region and high density region, the correction function f (Sus)=0, and no processing is carried out, so that the contrast is maintained as it is. This is a difference of functions shown in FIG. 16(b) as compared with functions shown in FIG. 16(a).

It was found that, when the size of the mask becomes smaller than 4 mm, the contrast of a minute structure is too emphasized, and the diagnostic property is lowered. On the ether hand, when the size of the mask is larger than 60 mm, the sharpness of the edge of the unsharpness image in a portion, in which a signal value is suddenly changed, is deteriorated as described above, and the undesired extension is conducted near the boundary between the area in which extension processing is desired, and the area in which extension processing is not desired. Further, it was found that even a frequency component corresponding to a rough change of the object is eliminated, and even when a subtraction operation is conducted by the correction function corresponding to the unsharp mask signal, the effect of the extension of the dynamic range can not be obtained.

Further, in the present invention, since the correction function is set as a function of the unsharp mask signal, the influence, in which the contrast of the high frequency component is lowered, is small even in a region in which compression processing is conducted, which is more effective for assuring the diagnostic property. However, the correction function is not limited to the function of the unsharp mask signal, but the correction function may be set as a function of the original image signal Sorg, in a simple method. For example, when the correction function is set so that the contrast is increased corresponding to the increase of the density in the region in which extension processing is conducted, the contrast can be increased by spreading the density difference. However, by this method, the high frequency component is also equally compressed in the region in which compression processing is conducted, so that the contrast is lowered.

Next, an embodiment, according to the present invention, in which the dynamic range is compressed and the frequency characteristic is compensated, will be described below. That is, in this embodiment, at least one portion of the image region is compression-processed so that a display density range is secured, and, on the other hand, the decrease of the contrast of the high frequency component due to the compression is prevented by the frequency emphasis.

Figure 8:
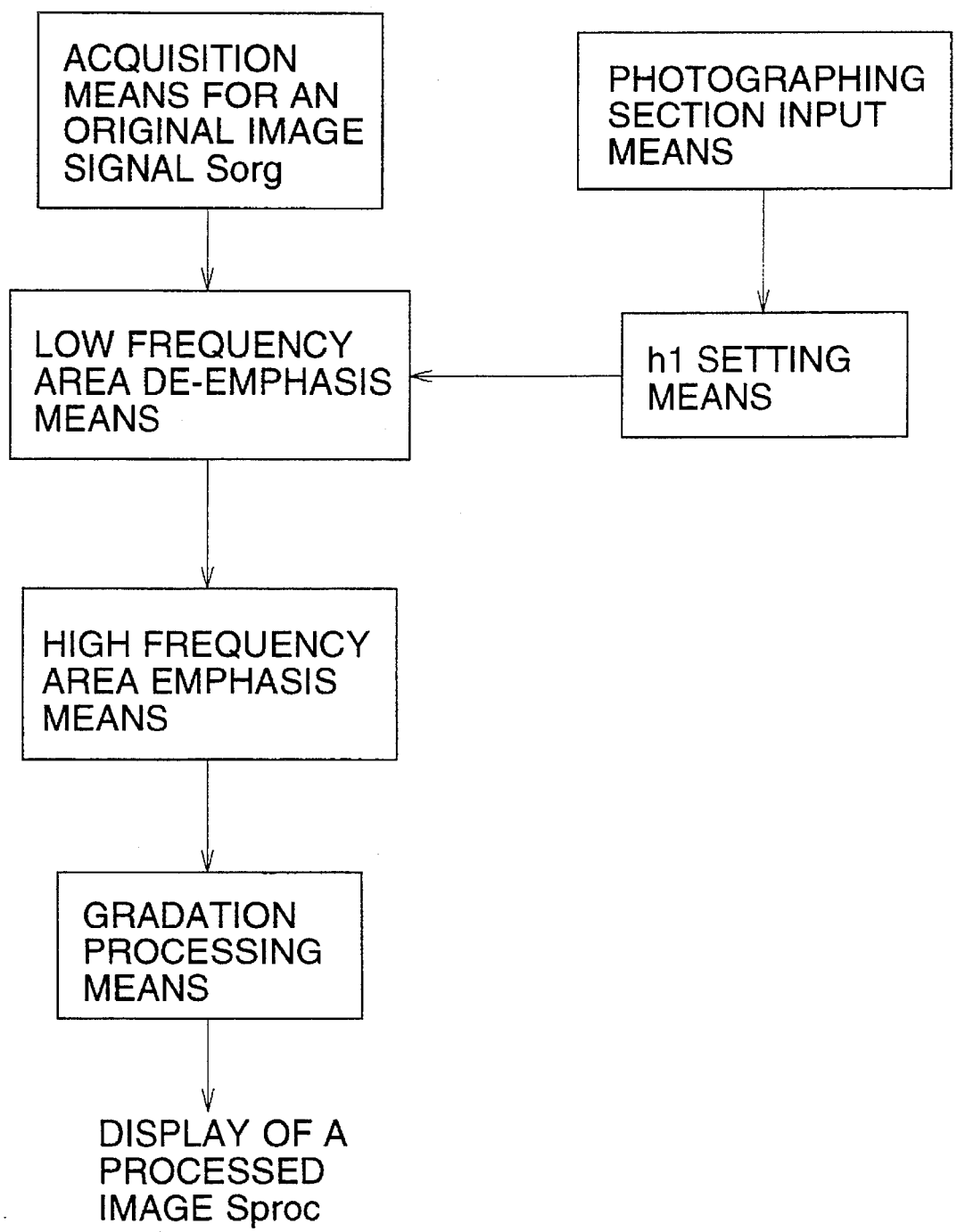
FIG. 8 is a block diagram for control of the first embodiment according to the second invention.

FIG. 8 shows a block diagram for control of the first embodiment according to the present second invention. An acquisition method of thee original image signal Sorg in an acquisition means of the original image signal, and an input method of the radiographing region in an input means of the radiographing region are the same as those of the aforementioned embodiment.

A h1 setting means is the means for setting a frequency h1 to discriminate a region in which the frequency-emphasis is conducted with information from the radiographing region input means.

Here, h1 determines limitation values of the mask sizes of the unsharp mask signal Sus1 which is set in a lower spatial frequency region, and the unsharp mask signal Sus2 which is see in a higher spatial frequency region. That is, the upper limit value of Sus1 and that of Sus2 are regulated by h1.

A preferable range of h1 is 0.01 lp/mm≦h1≦0.5 lp/mm, a more preferable range is 0.02 lp/mm≦h1≦0.3 lp/mm, and the most preferable range is 0.03 lp/mm≦h1≦0.1 lp/mm. When h1 is smaller than 0.02, the mask size of Sus1 becomes too large, and compression processing of the dynamic range can not be normally conducted. When h1 is larger than 0.3, there is a possibility that the mask size of Sus1 becomes too small. Therefore, even a structure, in which the contrast of the object is not desired to be lowered, is dynamic range-compressed, and the contrast is lowered, which is unpreferable.

When h1 is 0.03 lp/mm≦h1≦0.1 lp/mm, the effect of the dynamic range compression of the object and the effect of the frequency emphasis are well balanced, the quality characteristics of the image (contrast, sharpness, a range of expression, or the like) are extremely improved.

Figure 18:
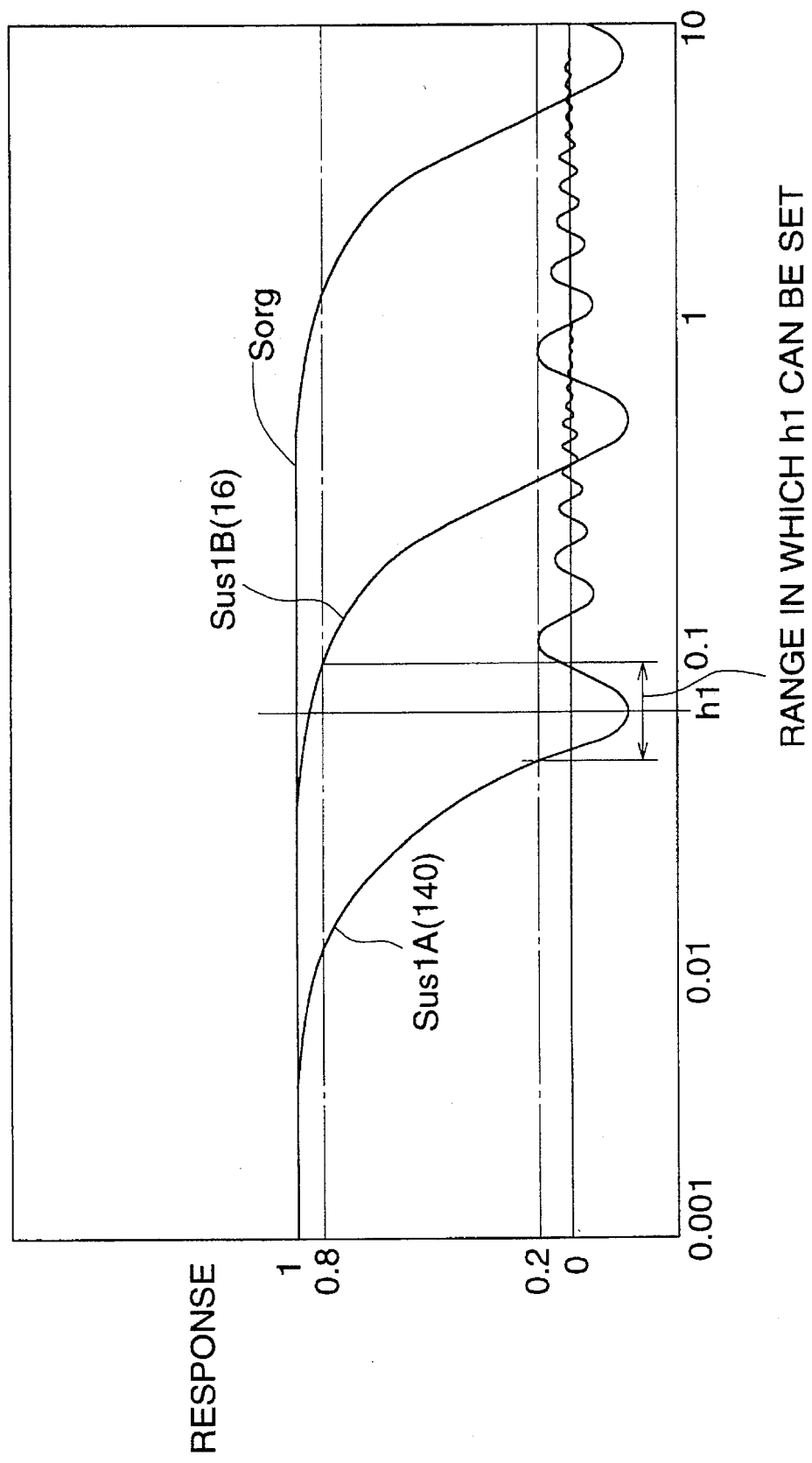
FIG. 18 is a diagram showing the change of the response characteristics due to a boundary frequency h1 in the embodiments of the second invention.

FIG. 18 shows the response characteristics of an unsharp mask signal Sus1A when h1 is set within the range of 0.05 lp/mm≦h1≦0.1 lp/mm, and an unsharp mask signal Sus1B when h1 is set to a value near 0.5 lp/mm.

A low frequency area de-emphasis means is used for de-emphasizing the frequency characteristics of the original image signal Sorg in a range of a frequency lower than h1.

Specifically, the first method is carried out in the same way as the aforementioned embodiment, that is, the following operations are carried out: the unsharp mask signal Sus1 is found; f1 (Sus1) is set as the first correction function which is monotonously decreased accompanied with the increase of Sus1; and de-emphasis processing is conducted by the following equation. The "monotone decrease" function includes not only a function which decreases the correction value in the entire region as a definition, but also a function having partially a region in which a change amount among the correction values is maintained at 0. The monotone increase function includes not only a function which increases the correction value in the entire region as a definition, but also a function having partially a region in which a change amount among the correction values is maintained at 0. Here, the unsharp mask signal Sus1 is set in the manner that the response is 0, for example, at a frequency lower than h1.

$$Sproc=Sorg+f1 \ (Sus1)$$

As an example of the first correction function f1 (Sus1), the following function can be described.

$$f1 \ (Sus1)=\alpha \ (A-Sus1)$$

where, the symbol A is constant, and determines a signal region in which the dynamic range compression is conducted (the minimum density). The symbol $\alpha$ is a constant, or a function which decreases accompanied with the increase of Sorg and Sus1, and determines a shape of the monotone decrease function. The symbol $\alpha$ is set within the range of $0\leq\alpha\leq 1.0$.

In the above equation, a compression ratio is determined by $\alpha$, that the compression ratio=$(1-\alpha)/1$ When the above equation is used for compression processing, $\alpha$ (=1-compression ratio) may be found instead of the compression ratio in the compression ratio determination means.

As the second method, the following method may be used for the de-emphasis: in a convolution operation in which a signal value of a pixel around a concerned pixel is multiplied by the convolution function for each pixel and the results are added, the response of the convolution function is decreased in the low frequency region. As a method by which the number of times of the convolution operation is reduced, the method which has been disclosed in Japanese Patent Publication Open to Public Inspection No. 246188/1985, can be used.

A high frequency region emphasis means is used for emphasizing the frequency characteristic in a region of the higher frequency than h1 of the original image signal Sorg, and the operation is conducted as follows.

Figure 9:
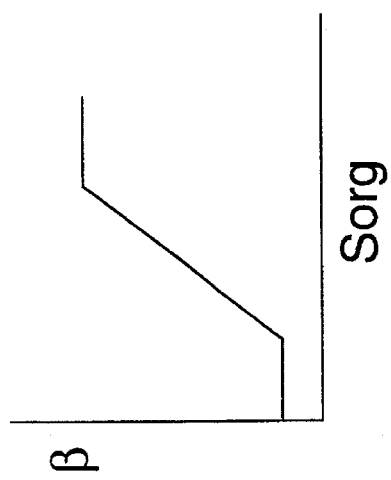
FIGS. 9(a), 9(b) and 9(c) are diagrams showing modes of a coefficient of a correction function of the first embodiment of the second invention.
Figure 9:
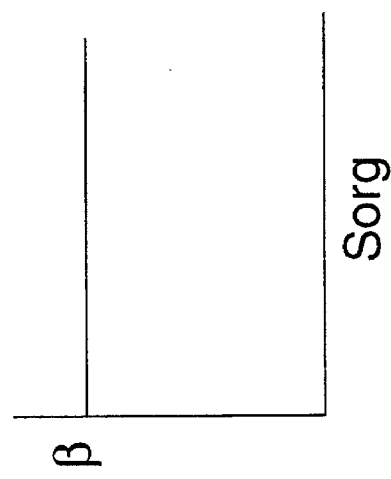
Figure 9:
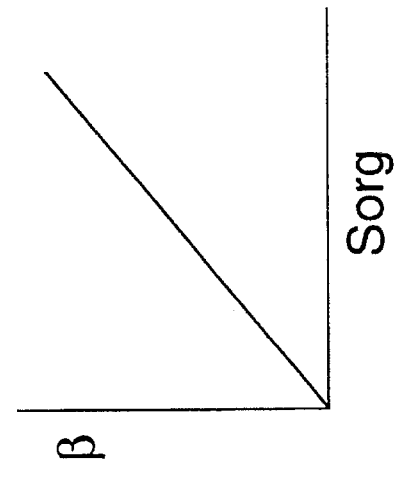

In the first method, the following equation is used in which the first processing signal Sproc1=Sorg+f1 (Sus1) is added by the second correction function f2 (Sorg–Sus2).

$$Sproc2=Sproc1+f2 \ (Sorg-Sus2)$$

where, Sus2 is the unsharp mask signal in which the response is smaller than the response of the original image signal Sorg in the range of a frequency higher than h1, and f2 (Sorg– Sus2) is a function which monotonously increases accompanied with the increase of (Sorg–Sus2). Concerning the correction function f2, the same pattern as the function f1 is considered, and specifically, the following function can be considered.

$$f2 \ (Sorg-Sus2)=\beta \ (Sorg-Sus2)$$

where, $\beta$ is a constant, or set to a value which increases accompanied with the increase of Sorg or Sus2. Examples of $\beta$ are shown in FIG. 9.

As the second method, the response of the convolution function in the convolution operation may be made to be large in the high frequency region.

The low frequency de-emphasis and the high frequency emphasis are not necessarily processed in this turn, and may be processed in reverse order. Further, initially, {f1 (Sus1)+ f2 (Sorg–Sus2)} may be calculated, and next, the result may be added by Sorg.

Figure 17:
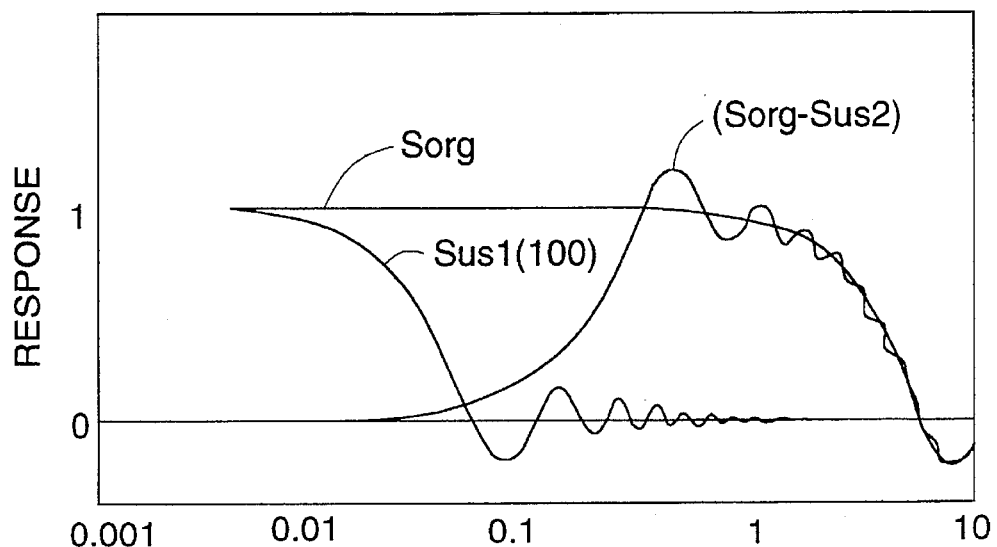
FIGS. 17(a) and 17(b) are diagrams showing characteristics of the responses in the embodiments of the second invention.
Figure 17:
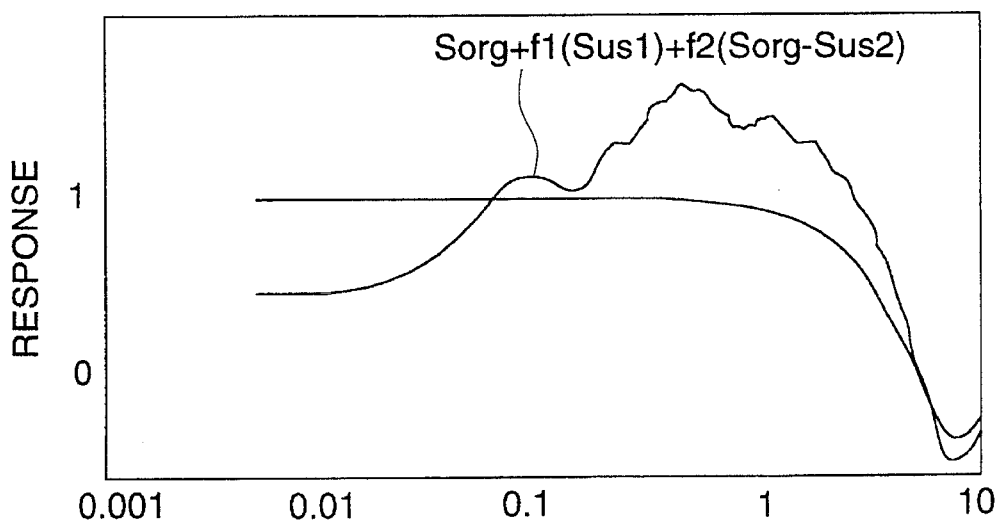

FIG. 17(a) shows an example of the unsharp mask signal Sus1, and (Sorg–Sus2). FIG. 17(b) shows a characteristic of the processed image signal which is obtained by adding these functions f1 (Sus1), and f2 (Sorg–Sus2) to the original image signal Sorg.

The mask size to determine Sus1 and Sus2 can be arbitrarily set within the range which satisfies conditions of h1.

However, in order to process the radiation image signal under more preferable conditions, the mask size, corresponding to Sus1, is preferably 10 mm to 60 mm in the length on the life-sized image, and more preferably 15 mm to 30 mm.

As described above, when the mask size is smaller than 10 mm, the frequency components corresponding to changes of a minute structure suddenly increase. Accordingly, when the correction function is set according to the unsharp mask signal Sus1 which has been obtained by this mask size, the contrast of the structure, which is important for the diagnostic purpose, is lowered, and the diagnostic property is drastically lowered.

On the other hand, when the size of the mask is larger than 60 mm, the sharpness of the edge of the unsharpness image at a portion, in which the signal value is suddenly changed, is deteriorated. Accordingly, undesired compression is conducted near the boundary between a region in which the compression is desired, and a region in which the compression is not desired, and even a frequency component corresponding to a rough change of the object is lost. Therefore, even when the value of the correction function according to the unsharp mask signal is added, the effects of dynamic range compression can hoe be obtained.

The object of frequency emphasis processing which is used in combination with dynamic range compression processing is to correct a resolving power of the contrast which has been deteriorated by compression of the dynamic range, and to correct a visual impression that the contrast seems to have been lowered. Accordingly, it was found that the mask size, which is different from that in conventional frequency emphasis processing, has the optimum value.

Specifically, the mask size corresponding to Sus2 is preferably 0.5 to 10 mm in the length of the life-sized image, and more preferably 0.8 to 5 mm.

When the mask size is smaller than 0.5 mm, a noise component of the image is emphasized and the image quality is deteriorated, which is undesirable. Further, when the mask size is larger than 10 mm, effects are lost in which an edge is emphasized so that lowering of the contrast is corrected, or the contrast is emphasized, which is undesirable. The mask size of the frequency emphasis processing used in this embodiment, is in general preferably small, and when the mask size is selected within the range of 0.8 mm to 5 mm, the image quality is drastically improved in combination with the effect of the dynamic range compression.

Further, in this embodiment, the maximum value of the absolute value of the correction function f1 (Sus1), which is a function of the unsharp mask signal Sus1, is obtained when the dynamic range of the concerned region of the object is ⅛ to ½, which is the preferable range. For example, when the dynamic range of the concerned region of the object is expressed by two digits, the maximum value of the absolute value of am amount of compression correction is preferably expressed by ¼ digits to 1 digit.

Further, when f1 (Sus1) is expressed by a linear function of the unsharp mask signal Sus1, that is, f1 (Sus1)=$\alpha$ (A-Sus), (where, A and $\alpha$ are constant), a preferable range of compression, by which a degree of compression is determined, is $0.2 \leq \alpha \leq 1.0$, and more preferably $0.4 \leq \alpha \leq 0.8$.

When an amount of correction is too small, the effect of compression of the dynamic range can not be obtained. On the other hand, when an amount of correction is too large, a relationship of magnitude of the density in each region in the original image is reversed, (for example, the average density of a mediastinum region becomes larger than that of a lung field), and therefore, the image becomes unsuitable for diagnostic purposes. For example, when an inclination $\alpha$ of the linear function is larger than 1, the above-mentioned problem occurs.

Further, in this embodiment, when a correction function f3 (Sorg−Sus3), which is a function of the unsharp mask signal Sus3, is expressed by a function of (Sorg−Sus3), such as

*f*3 (Sorg−Sus3)=$\beta$ (Sorg−Sus3), (where $\beta$ is constant or a function of Sorg and Sus3), a preferable range of $\beta$, by which a degree of the emphasis is decided, is $0.2 \leq \beta \leq 1.8$, and more preferably is $0.4 \leq \beta \leq 1.4$.

When an amount of correction is too small, the effect of the dynamic range compression can not be obtained. On the other hand, when an amount of correction is too large, as described before, since the object of frequency emphasis processing which is used in combination with dynamic range compression processing is to correct a resolving power of the contrast which has been deteriorated by compression of the dynamic range, and to correct a visual impression that the contrast seems as if it were lowered, the obtained image is quit different from a conventional radiation image. A degree of emphasis of the frequency emphasis processing used in this embodiment is in general preferably small. When $\beta$ is selected within the range of $0.4 \leq \beta \leq 0.8$, the image quality is drastically improved in combination with the effect of the dynamic range compression.

A gradation processing means outputs the processed image signal Sproc, in which the second processed image signal Sproc2 is gradation conversion processed, and displays it on the monitor 20. Gradation conversion processing may be carried out before the correction of the frequency characteristic, but it is preferable that gradation conversion processing is conducted after the correction of the frequency characteristic.

Figure 10:
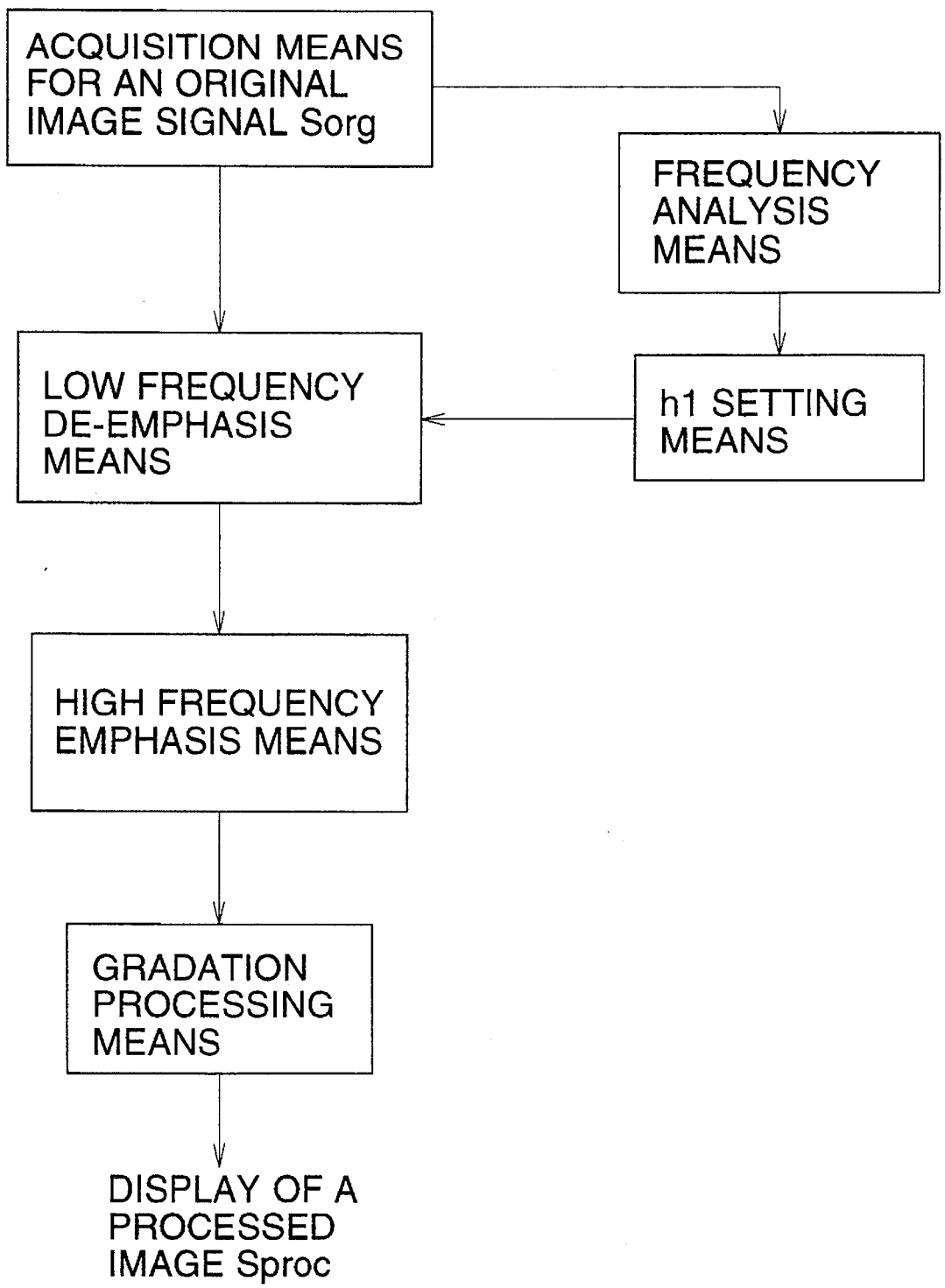
FIG. 10 is a block diagram for control of the second embodiment of the second invention.

FIG. 10 shows the second embodiment of the present invention. The difference from the first embodiment is as follows: when the original image signal Sorg is frequency-analyzed, the strength is found for each frequency region; and thereby, h1 is set. As a frequency analysis method, a method such as, for example, FFT (Fast Fourier Transformation), can be used.

Other parts are the same as the first embodiment, and the same functions can be obtained.

Figure 11:
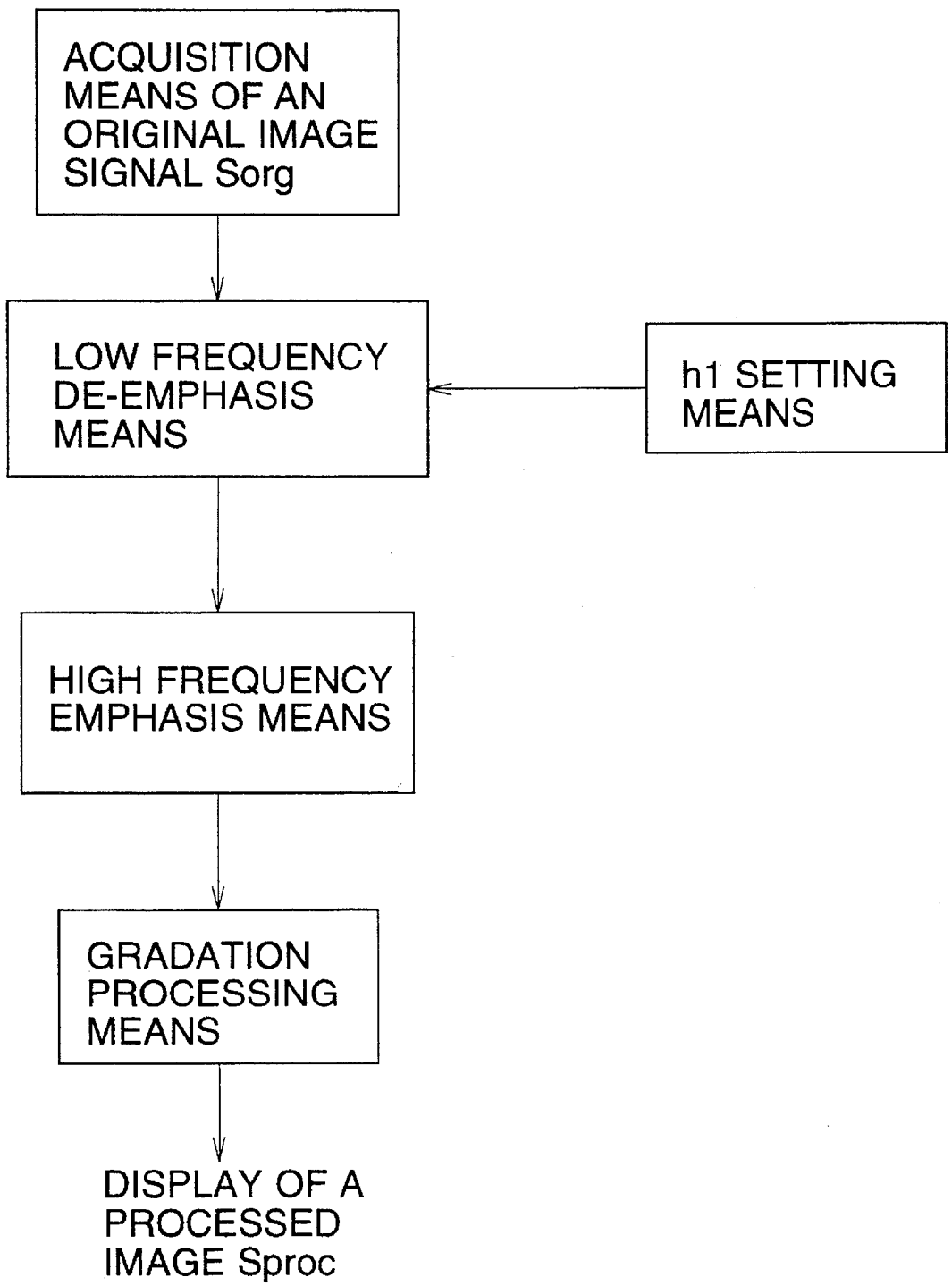
FIG. 11 is a block diagram for control of the third embodiment of the second invention.

FIG. 11 shows the third embodiment according to the present invention, in which h1 is set by a direct input from a key board 21, not through a radiographic region input means or a frequency analysis means; or information is stored in a memory in advance, and is read and used for setting of h1. Other means are the same as those of the first and second embodiments, and the same functions can be obtained.

Next, the embodiment, in which dynamic range compression processing is combined with gradation conversion processing, will be described.

Figure 12:
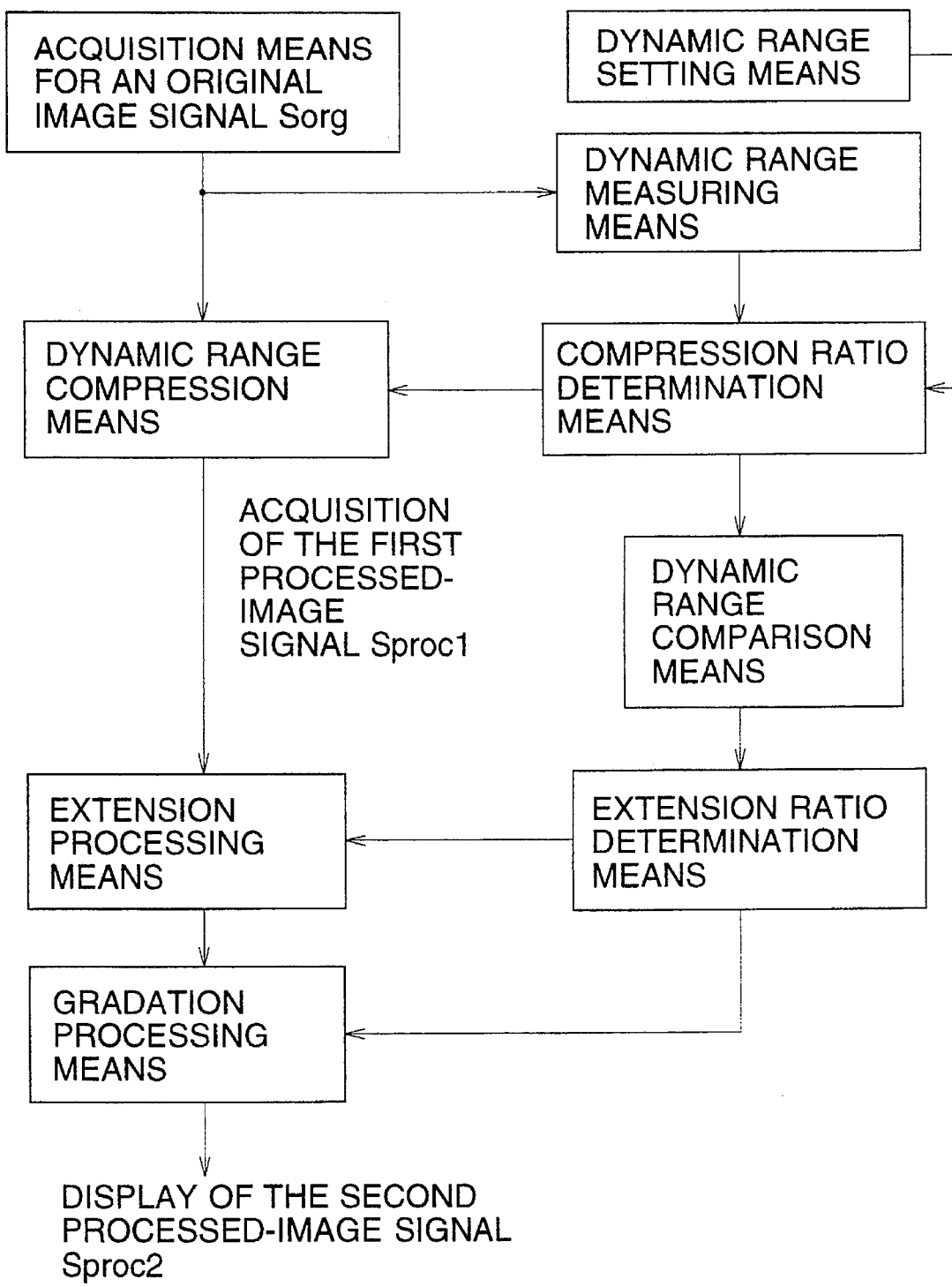
FIG. 12 is a block diagram for control of the first embodiment of the third invention.

FIG. 12 shows a block diagram for control of the first embodiment according to the present invention.

An acquisition method of the original image signal Sorg in an acquisition means of the original image signal Sorg, is the same as the acquisition method of embodiments of the aforementioned inventions.

A dynamic range measuring means is used for measuring the dynamic range of the original image, and the maximum value and the minimum value of data of the object image region are found from a density histogram of the acquired original image signal Sorg or the unsharp mask signal Sus1, and the dynamic range is obtained from the maximum and minimum values.

Alternatively, the maximum and minimum values are found from a profile signal of the object image, and the dynamic range may be found therefrom.

A dynamic range setting means is a means by which the dynamic range of the processed image signal Sproc (the first processed image signal Sproc1 after compression processing, and before gradation processing) is set.

As the first method, the following operations are conducted: the dynamic range of the processed image signal Sproc with respect to the dynamic range of the original image signal Sorg is set in advance; the compression ratio with respect to the dynamic range of the original image signal Sorg is found in order to obtain the previously set dynamic range; a conversion table (LUT), which converts the dynamic range of the original image into the compression ratio is stored in a memory; and the compression ratio corresponding to the dynamic range of the processed image signal Sproc is found. In this case, it is only defined that the compression ratio is changed under a constant relationship depending on the dynamic range of the original image signal Sorg, and not depending on the dynamic range of the object. Accordingly, it is not necessary that the dynamic range of the processed image be constant As the second method, the dynamic range of the processed image may be inputted by the key board 21.

As the third method, the dynamic range of the processed image signal Sproc which has been set in advance, is stored in a memory, and then, read in the control system. In this case, it can be considered that the dynamic range of the processed image signal Sproc is set corresponding to the dynamic range of the original image signal Sorg, and stored in the memory. However, since it is necessary that the compression ratio with respect to the dynamic range of the processed image signal Sproc is determined after the above-mentioned operation, it is better that the compression ratio is found directly with respect to the dynamic range of the original image signal Sorg as in the first method.

A compression ratio determination means is a means by which the compression ratio of the original image signal Sorg, which is used for obtaining the dynamic range of the processed image signal Sproc, is determined.

Here, the compression ratio is defined as follows.

Compression ratio=(the dynamic range of a compression processed image)/(the dynamic range of an original image)

The first method of the dynamic range setting means has also the function of the compression ratio determination means because the compression ratio can be directly found from the dynamic range of the original image signal Sorg, and the compression ratio, which is arbitrarily set, can be obtained in one operation.

As a method for determining the compression ratio with respect to the dynamic range of the processed image signal Sproc which is set by the aforementioned second and third methods in the dynamic range setting means, the compression ratio may be round from the defined equation of the compression ratio according to the dynamic range of the processed image signal Sproc, which is inputted by the key board or read out from the memory, and the dynamic range of the original image signal Sorg.

A dynamic range compression means conducts compression processing on the original image signal Sorg using the compression ratio determined as described above.

As the first method, there is a compression processing method which is used in the entire frequency region as it is, that is, which is the same compression processing method as in compression processing which is conducted using the correction function f1 (Sus) of the unsharp mask signal Sus1, which is monotoneously decreased, as the first method having been conducted in the frequency de-emphasis processing in the low frequency region, in the first embodiment of the invention in which the aforementioned dynamic range compression processing is confined with the frequency emphasis.

As the second method, the convolution operation may be used which is the second method used in frequency de-emphasis processing in the low frequency region, in the first embodiment of the aforementioned invention.

A dynamic range comparison means compares the dynamic range of the original image signal Sorg which has been measured by the dynamic range measuring means, with the dynamic range of the processed image signal Sproc which has been set my the dynamic range setting means. The dynamic ranges to be compared can also be calculated from data of the compression ratio determination means.

An extension ratio determination means is used for obtaining the extension ratio by which the dynamic range of the processed image signal Sproc is extended according to the result of the comparison by the dynamic range comparison means.

Here, the extension ratio is preferably determined so that the dynamic range of the original image signal Sorg is approximately equal no the dynamic range of the processed image signal Sproc.

An extension processing means extension-processes the dynamic range according to the extension ratio which has been determined by the afore-mentioned means.

Here, extension processing is emphasis processing in the entire frequency region, and its function is substantially the same as that of gradation processing.

Window processing is the simplest and most preferable processing for this purpose.

Further, the extension conversion table (LUT) may also be used for this purpose.

The extension method includes a method for extending the entire image region, a method for extending only a portion on which compression processing has been conducted, and a method for extending only a portion on which compression processing has not been conducted. One of these methods may be selected corresponding to the distribution characteristic of the concerned region.

A gradation processing means is a mean by which gradation processing is conducted so that the final processed image signal Sproc, which has been extended after compression processing, is displayed. The gradation processing is conducted according to the gradation conversion characteristic which has been set so that the optimum image can be displayed when the original image signal Sorg is processed.

The processed image signal Sproc after extension processing, is processed by the gradation conversion table (LUT) which has been previously set, and further, the image signal before extension processing, may be gradation processed from one gradation conversion table by which gradation processing is conducted together with extension processing. Specifically, the gradation conversion table, in which the extension conversion table values are multiplied by the gradation conversion table values after extension processing, may be used.

Figure 19:
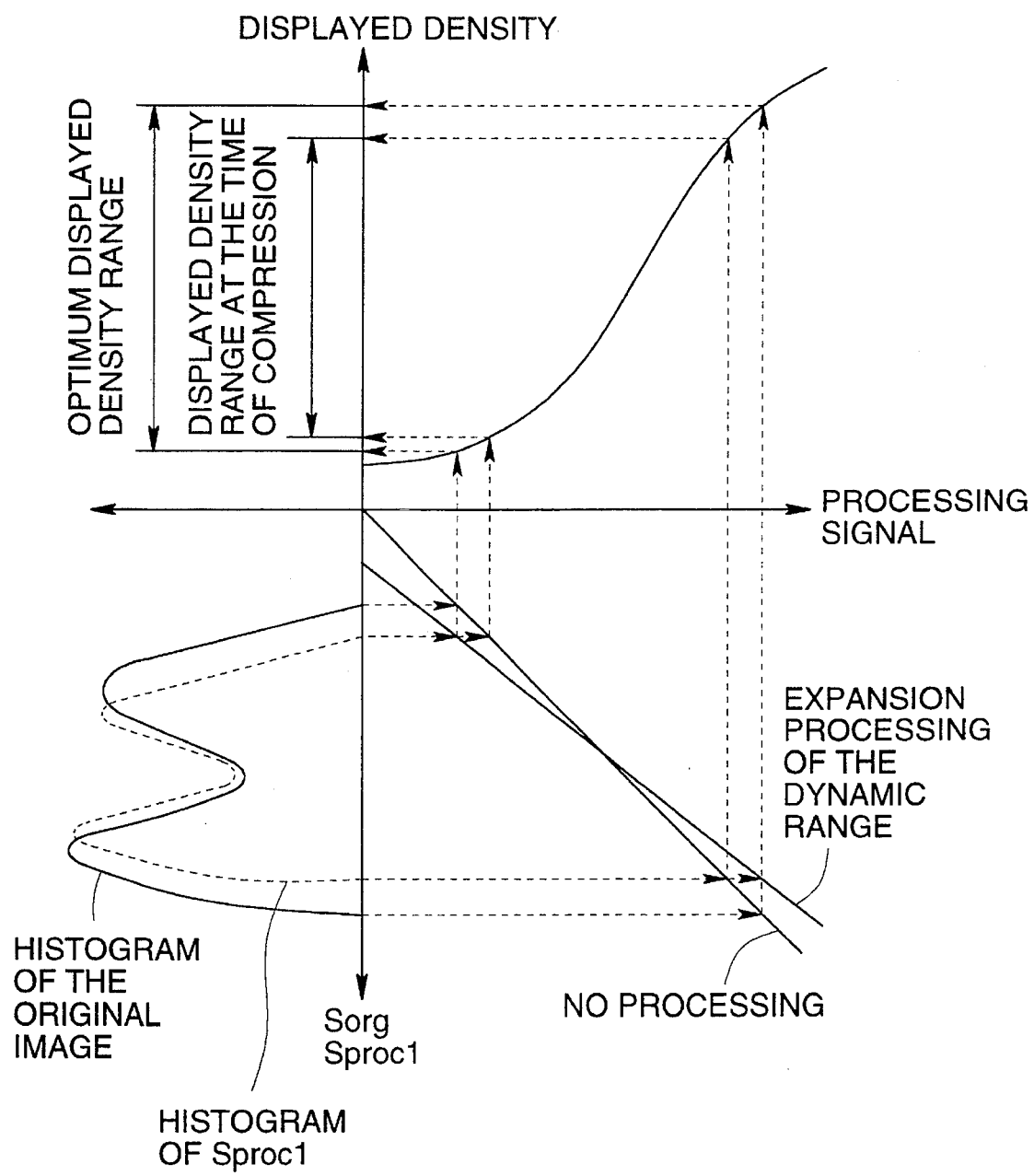
FIG. 19 is a diagram showing characteristics of signals in the embodiments of the third invention.

FIG. 19 shows conditions of each signal in the case where processing according to this embodiment is conducted, and in the case where the processing is not conducted. In FIG. 19, it can be seen that the dynamic range of the processed image signal Sproc1, which has been compression processed once, is returned to the same dynamic range as that of the original image signal Sorg when extension (enlargement) processing is conducted on the dynamic range.

Figure 20:
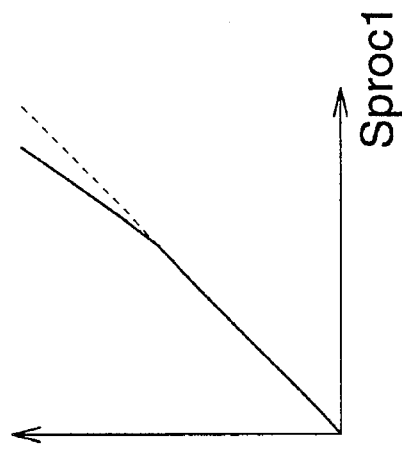
FIGS. 20(a), 20(b), 20(c) and 20(d) are diagrams showing examples of gradation conversion characteristics in the embodiments of the third invention.
Figure 20:
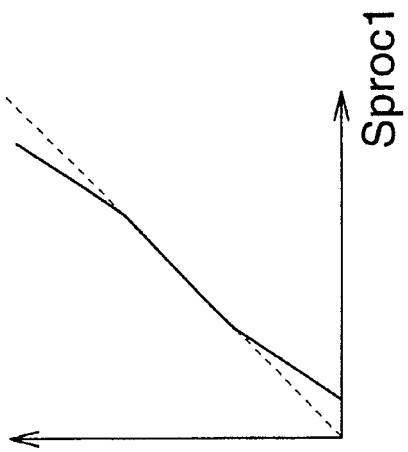
Figure 20:
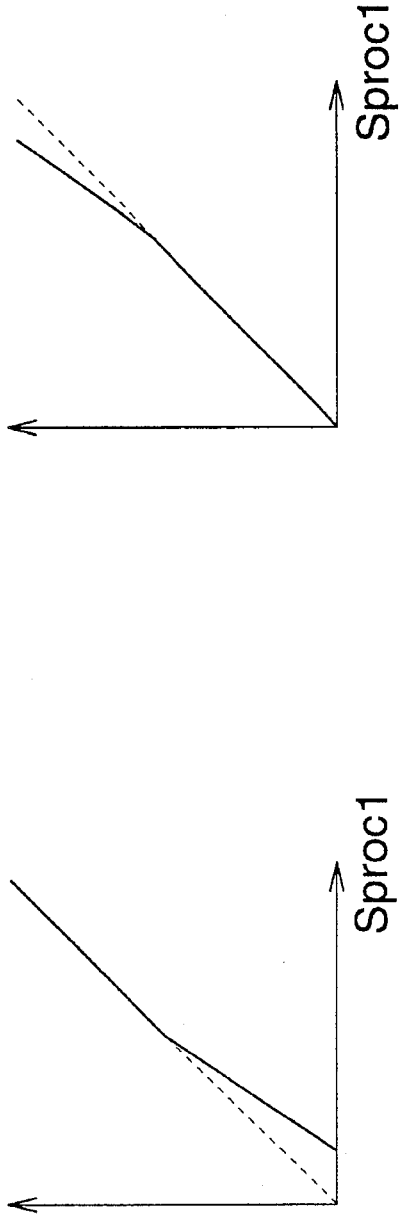
Figure 20:
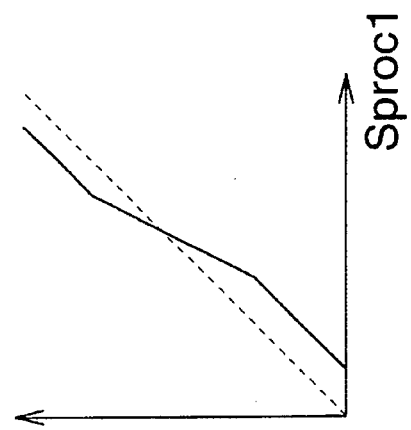

FIG. 20 shows each mode of the characteristic of gradation conversion processing with respect to the first processed image signal Sproc1.

Figure 13:
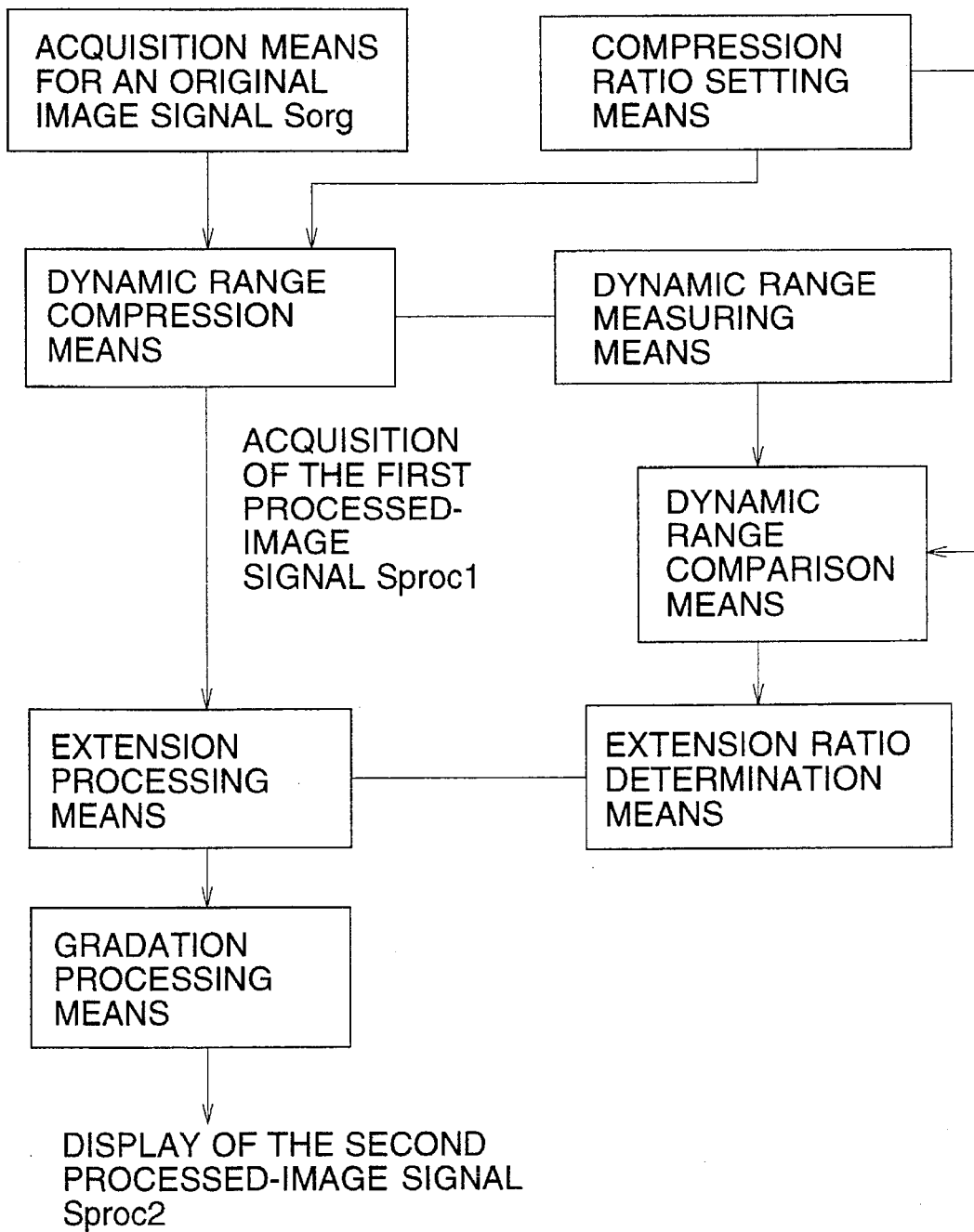
FIG. 13 is a block diagram for control of the second embodiment of the third invention.

FIG. 13 shows a block diagram for control of the second embodiment of the present invention. Only different portions from the first embodiment will be described as follows: the compression ratio setting means sets the compression ratio without depending on the dynamic range of the original image signal Sorg; the dynamic range measuring means measures the dynamic range of the processed image signal Sproc; the dynamic range comparison means compares the dynamic range before compression processing with the dynamic range after compression processing according to the dynamic range of the processed image signal Sproc and the compression ratio which has been set as described above; and the extension ratio is determined according to the results of the comparison.

When the compression ratio is set without dependence on the dynamic range of the original image as described above, the dynamic range of the compression processed image is not previously set. However, when the dynamic range after compression processing is measured, the dynamic ranges before and after compression processing can be obtained, and therefore, the extension ratio corresponding to the dynamic range can be set.

Figure 14:
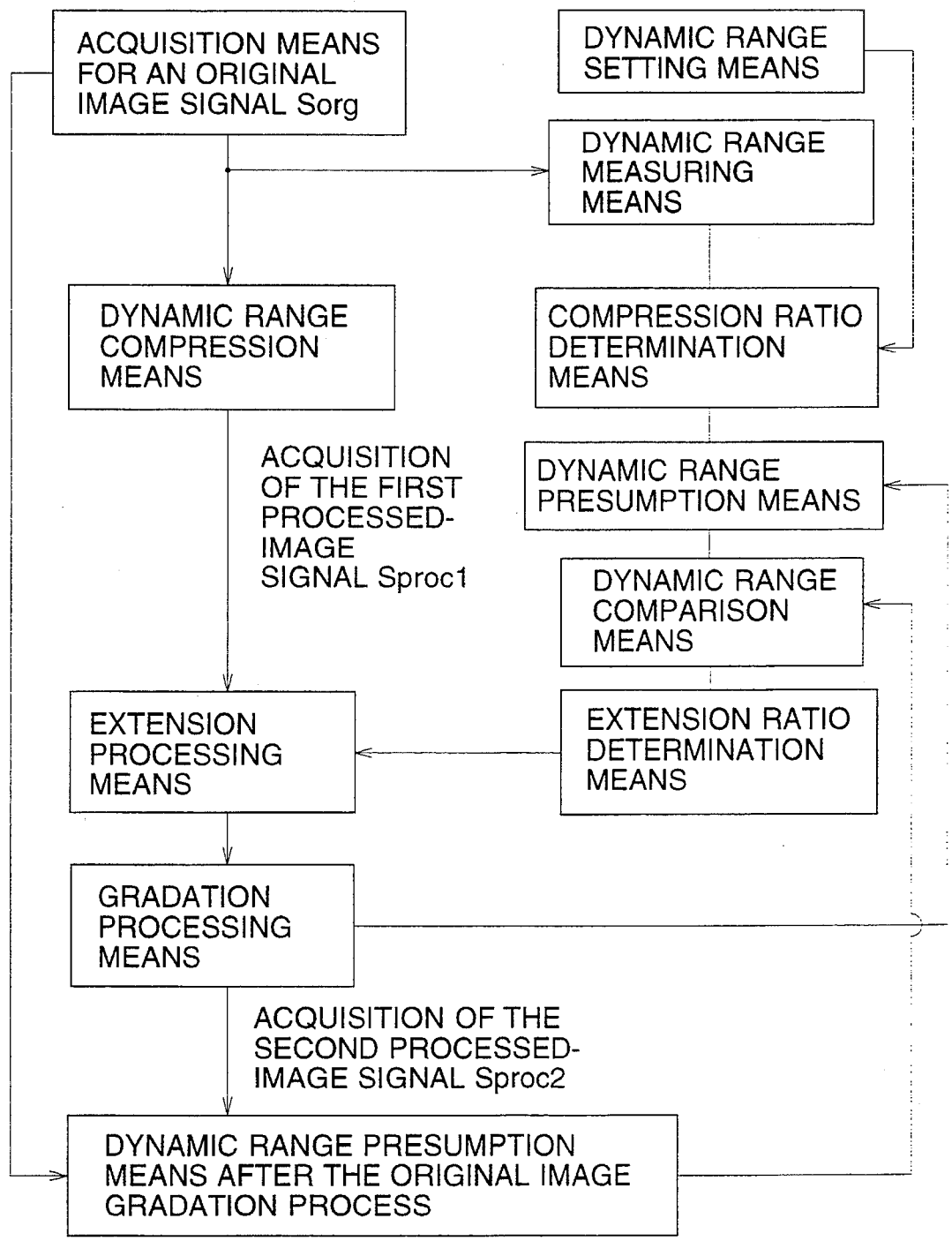
FIG. 14 is a block diagram for control of the third embodiment of the third invention.

FIG. 14 shows a block diagram for control of the third embodiment according to the present invention.

Different portions from the first embodiment will be described as follows: a presumption means for "dynamic range after original image gradation processing" is provided, by which the dynamic range at the time when the original image signal Sorg is gradation processed by the gradation processing means according to information of the original image signal Sorg and the gradation processing means, is presumed; and a presumption means for "dynamic range after gradation processing of the compression processed image" is provided, by which the dynamic range of the image, in which the first processed image signal Sproc is gradation processed by the gradation conversion processing means, is presumed according to information, which is sent from the compression ratio determination means, of the dynamic range of the first processed image signal Sproc1, which has been compression processed, and gradation conversion characteristic information which is sent from the gradation processing means.

A dynamic range comparison means compares the dynamic range after gradation processing of the original image with the dynamic range after gradation processing of the compression processed image. An extension ratio determination means determines the extension ratio of the first processed image which has been compression processed according to the results of the comparison. Specifically, the extension ratio is determined so that the dynamic range of the gradation processed original image signal Sorg is approximately equal to the dynamic range of the compression processed image signal. When dynamic ranges of both display images, which are gradation processed, are made to be equal to each other, influence due to compression processing on the dynamic range of the image, which is actually displayed, can be more surely eliminated.

As described above, according to the present invention, when compression processing and extension processing of the dynamic range, frequency characteristic correction, and gradation processing are appropriately combined to each other, influence on the dynamic range of the visible image due to compression processing can be avoided, and while the display density region is made to be approximately equal to the display density region of the original image signal, the contrast of the concerned region can be greatly enhanced, so that the diagnostic properties in the radiation image can be greatly improved.

What is claimed is:

1. A method of reproducing a radiographic image of a subject by processing radiographic image signals Sorg in a form of a plurality of pixels, wherein each radiographic image signal indicates a signal level corresponding to an amount of radioactive rays transmitted through each portion of the subject, and the radiographic image signals Sorg have a plurality of spatial frequency components depending on level changes between pixels and a signal level range indicating a level difference between a maximum and a minimum signal level, the method comprising the steps of:

decreasing a response in a low frequency region of the radiographic image signals Sorg, thereby compressing a signal level range of a part of the low frequency region of the radiographic image signals Sorg;

increasing a response in the low frequency region of the radiographic image signals Sorg, thereby expanding a signal level range of a part of the low frequency region of the radiographic image signals Sorg;

obtaining radiographic image signals Sproc by the decreasing and increasing steps to thereby compress and expand the low frequency region of the radiographic image signals; and obtaining, for each of said plurality of pixels, a first unsharp mask signal Sus1 used for the decreasing step and a second unsharp mask signal Sus2 used for the increasing step, the first and second unsharp mask signals Sus1 and Sus2 respectively including a low frequency component, said low frequency component being subjected to the decreasing and increasing steps; and wherein:

a first correction function f1(Sus1) in which a correction value is decreased as Sus1 is increased is used in the decreasing step;

a second correction function f2(Sus2) in which a correction value is increased as Sus2 is increased is used in the increasing step; and a plurality of the image signals Sproc are obtained by use of an equation:

$$Sproc=Sorg+f1(Sus1)+f2(Sus2).$$

2. The method of claim 1, further comprising determining the correction functions f1(Sus1) and f2(Sus2) so that a signal level range of the image signals Sproc is substantially equal to a signal level range of the image signals Sorg.

3. The method of claim 1, further comprising determining the correction functions f1(Sus1) and f2(Sus2) so that a signal level range of the image signals Sproc is narrower than a signal level range of the image signals Sorg.

4. The method of claim 1, wherein a response of the unsharp mask signal Sus1 does not include a broader frequency region and a higher frequency component when compared to a response of the unsharp mask signal Sus2.

5. A method of reproducing a radiographic image of a subject by processing radiographic image signals Sorg in a form of a plurality of pixels, wherein each radiographic image signal indicates a signal level corresponding to an amount of radioactive rays transmitted through each portion of the subject, and the radiographic image signals Sorg have a plurality of spatial frequency components depending on level changes between pixels and a signal level range indicating a level difference between a maximum and a minimum signal level, the method comprising the steps of:

decreasing a response in a low frequency region of the radiographic image signals Sorg, thereby compressing a signal level range of the low frequency region of the radiographic image signals Sorg;

increasing a response in a high frequency region of the radiographic image signals Sorg, thereby enhancing the high frequency region of the radiographic image signals Sorg;

obtaining radiographic image signals Sproc by the decreasing and increasing steps to thereby compress and enhance the radiographic image signals and wherein:

the image signals Sorg when compared with the image signals Sproc, have frequency characteristics which are reduced in a low frequency region thereof that is lower than a predetermined frequency h1 and have frequency characteristics which are enhanced in a high frequency region thereof that is higher than the frequency h1; and obtaining, for each of said plurality of pixels, unsharp mask signals Sus1 and Sus2 of the image signals Sorg in which a response of the unsharp mask signal Sus1 at the frequency h1 is 0.2 times lower than a value of the image signals Sorg and a response of the unsharp mask signal Sus2 at the frequency h1 is 0.8 times higher than a value of the image signals Sorg, and wherein the image signals Sproc are calculated by use of an equation:

Sproc=Sorg+$f1$(Sus1)+$f2$(Sorg−Sus2)

wherein f1(Sus1) is a function which decreases as Sus1 increases, and f2(Sorg−Sus2) is a function which increases as (Sorg−Sus2) increases.

6. The method of claim 5, further comprising adjusting the frequency h1 in accordance with a portion of the subject such that the frequency h1 is set on a low frequency side when the image signals include a plurality of low frequency components, and is set on a high frequency side when the image signals include a plurality of high frequency components.

7. The method of claim 5, wherein the frequency h1 is determined within a range of 0.01 lp/mm≦h1≦0.5 lp/mm.

8. The method of claim 5, comprising providing the enhanced frequency characteristics for one of:

the low frequency region which is provided with a frequency compression in the image signals Sorg, and a region which is not provided with the frequency compression.

9. A method of reproducing a radiographic image of a subject by processing radiographic image signals Sorg in a form of a plurality of pixels, wherein each radiographic image signal indicates a signal level corresponding to an amount of radioactive rays transmitted through each portion of the subject, and the radiographic image signals Sorg have a plurality of spatial frequency components depending on level changes between each of said plurality of pixels and a signal level range indicating a level difference between a maximum and a minimum signal level, the method comprising the steps of:

obtaining a first plurality of image signals Sproc1 by providing a signal level range compression to the image signals Sorg to decrease a response in a low frequency region of the image signals Sorg;

providing a signal level range expansion to enhance a response of an entire frequency region of the first plurality of image signals Sproc1 in accordance with a signal level range of the first plurality of image signals Sproc1; and thereafter obtaining a second plurality of image signals Sproc2 by providing a gradation treatment to the expanded first plurality of image signals Sproc1, wherein the step of providing the signal level range compression comprises:

obtaining a plurality of unsharp mask signals Sus for each of the plurality of pixels of the image signals Sorg at a low frequency region; and obtaining the image signals Sproc by use of an equation for the image signals Sorg as follows:

Sproc=Sorg+$f$(Sus)

wherein f(Sus) is a function which decreases as Sus increases.

10. The method of claim 9, wherein the provided signal level range expansion expands one of:

the entire signal level range of the first plurality of image signals Sproc1;

the image signals Sorg;

a compressed region in the signal level range of the first image signals Sproc1; and a region other than the compressed region in the signal level range of the first image signals Sproc1.

11. The method of claim 9, comprising conducting the signal level expansion such that a signal level range of one of the second image signals Sproc2 and Sproc2' is made substantially equal to a signal level range of a different subject.

12. The method of claim 9, comprising providing the gradation treatment such that a signal level range of one of the second image signals Sproc2 and Sproc2' is made substantially equal to a signal level range of the image signals Sorg which are subjected to the gradation treatment.

13. The method of claim 9, wherein a compression rate during compression of the signal level range of the image signals Sorg increases as the signal level range increases.

14. The method of claim 9, wherein a compression rate is changed so that the signal level range of Sproc1 is made substantially equal to a signal level range of a different subject.

15. The method of claim 9, wherein a compression rate is changed so that a signal level range of Sproc1 is made to be a predetermined signal level range.

16. A method of reproducing a radiographic image of a subject by processing radiographic image signals Sorg in a form of a plurality of pixels, wherein each radiographic image signal indicates a signal level corresponding to an amount of radioactive rays transmitted through each portion of the subject, and the radiographic image signals Sorg have a plurality of spatial frequency components depending on level changes between each of said plurality of pixels and a signal level range indicating a level difference between a maximum and a minimum signal level, the method comprising the steps of:

obtaining a first plurality of image signals Sproc1' by providing a signal level range expansion to the image signals Sorg to enhance a response of an entire frequency region of the image signals Sorg;

applying a compressing process to decrease a response of a low frequency region of the first image signals Sproc1 in accordance with a signal level range of the first image signals Sproc1'; and thereafter obtaining a plurality of second image signals Sproc2' by providing a gradation treatment to the compressed first image signals Sproc1', wherein the step of applying a compressing process comprises:

obtaining a plurality of unsharp mask signals Sus for each of the plurality of pixels of the image signals Sorg at a low frequency region; and obtaining the image signals Sproc by use of an equation for the image signals Sorg as follows:

Sproc=Sorg+$f$(Sus)

wherein f(Sus) is a function which decreases as Sus increases.

17. The method of claim 16, wherein the provided signal level range expansion expands one of:

the entire signal level range of the first plurality of image signals Sproc1;

the image signals Sorg;

a compressed region in the signal level range of the first image signals Sproc1; and a region other than the compressed region in the signal level range of the first image signals Sproc1.

18. The method of claim 16, comprising conducting the signal level expansion such that a signal level range of the second image signals Sproc2 is made substantially equal to a signal level range of a different subject.

19. The method of claim 16, comprising providing the gradation treatment such that a signal level range of the second image signals Sproc2 is made substantially equal to a signal level range of the image signals Sorg which are subjected to the gradation treatment.

20. The method of claim 16, wherein a compression rate during compression of the signal level range of the image signals Sorg increases as the signal level range increases.

21. The method of claim 16, wherein a compression rate is changed so that the signal level range of Sproc1 is made substantially equal to a signal level range of a different subject.

22. The method of claim 16, wherein a compression rate is changed so that a signal level range of Sproc1 is made to be a predetermined signal level range.

* * * * *